United States Patent
Won et al.

(10) Patent No.: US 9,250,371 B2
(45) Date of Patent: Feb. 2, 2016

(54) POLARIZING FILM, ANTI-REFLECTIVE FILM AND DISPLAY DEVICE INCLUDING THE SAME

(71) Applicant: SAMSUNG ELECTRONICS CO., LTD., Suwon-si, Gyeonggi-do (KR)

(72) Inventors: Jong Hoon Won, Yongin-si (KR); Myung Man Kim, Suwon-si (KR); Deuk Kyu Moon, Seoul (KR); Feifei Fang, Suwon-si (KR); Yong Joo Lee, Suwon-si (KR); Beom Seok Kim, Seoul (KR); Myung-Sup Jung, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 115 days.

(21) Appl. No.: 14/072,172

(22) Filed: Nov. 5, 2013

(65) Prior Publication Data

US 2014/0126053 A1    May 8, 2014

(30) Foreign Application Priority Data

Nov. 6, 2012 (KR) .................. 10-2012-0125028

(51) Int. Cl.
*G02B 5/30* (2006.01)
*C09K 19/60* (2006.01)
(Continued)

(52) U.S. Cl.
CPC ............ *G02B 5/305* (2013.01); *C09K 19/3491* (2013.01); *C09K 19/60* (2013.01); *C09K 19/601* (2013.01); *G02B 1/08* (2013.01); *G02B 5/3016* (2013.01); *G02F 1/133533* (2013.01);
(Continued)

(58) Field of Classification Search
CPC ........ G02B 5/305; G02B 1/08; G02B 5/3016; C09K 19/60; C09K 19/3491; C09K 19/601; G02F 1/133533; G02F 2001/133635; G02F 2201/38; G02F 2202/043; G02F 2001/133541; G02F 2001/133638
USPC ................. 359/487.02, 488.01; 349/96, 97; 252/299.1
See application file for complete search history.

(56) References Cited

U.S. PATENT DOCUMENTS 4,859,039 A    8/1989    Okumura et al.
5,318,856 A    6/1994    Misawa et al.
(Continued)

FOREIGN PATENT DOCUMENTS

JP    3086363 B2    7/2000
JP    2004098420 A    4/2004
(Continued)

OTHER PUBLICATIONS

Su Hyun Park, et al., "38.6L: Late-News Paper: Advanced Coatable Polarizer Technology by Using Novel Liquid Crystalline Materials and Organic Dyes," SID 11 Digest, 2011, pp. 532-535. Article first published online: Aug. 16, 2012.
(Continued)

*Primary Examiner* — Frank Font
(74) *Attorney, Agent, or Firm* — Cantor Colburn LLP

(57) ABSTRACT

An anti-reflective film includes a polarizing film and a compensation film, where the polarizing film includes a polymer, and a plurality of dichroic dyes having an absorption wavelength region in a range from about 380 nanometers to about 780 nanometers, and a reflective color of the anti-reflective film is substantially in a range of $-5 \leq a^* \leq 5$ and $-5 \leq b^* \leq 5$ in CIE-Lab color coordinates.

44 Claims, 7 Drawing Sheets

Incident unpolarized light

(51) Int. Cl.
*G02B 1/08* (2006.01)
*C09K 19/34* (2006.01)
*G02F 1/1335* (2006.01)
*G02F 1/13363* (2006.01)

(52) U.S. Cl.
CPC ............... *G02F2001/133541* (2013.01); *G02F 2001/133635* (2013.01); *G02F 2001/133638* (2013.01); *G02F 2201/38* (2013.01); *G02F 2202/043* (2013.01)

(56) References Cited

U.S. PATENT DOCUMENTS

| | | |
|---|---|---|
| 5,430,565 A | 7/1995 | Yamanouchi et al. |
| 7,852,561 B2 | 12/2010 | Chiba et al. |
| 7,989,036 B2 | 8/2011 | Harris et al. |
| 8,159,639 B2 | 4/2012 | Yanai et al. |
| 2005/0243245 A1 | 11/2005 | Taguchi et al. |
| 2007/0146887 A1 | 6/2007 | Ikeda et al. |
| 2011/0157540 A1 | 6/2011 | Jung et al. |
| 2013/0172503 A1 | 7/2013 | Kim et al. |

FOREIGN PATENT DOCUMENTS

| | | |
|---|---|---|
| JP | 3836283 B2 | 8/2006 |
| JP | 2009103854 A | 5/2009 |
| JP | 2011048311 A | 3/2011 |
| JP | 2011128924 A | 6/2011 |
| JP | 2011150162 A | 8/2011 |
| JP | 2011179019 A | 9/2011 |
| JP | 2012058381 A | 3/2012 |
| KR | 1020110075363 A | 7/2011 |
| KR | 1020130093765 A | 8/2013 |
| WO | 2011024891 | 3/2011 |

OTHER PUBLICATIONS

Extended European Search Report dated Mar. 21, 2014 of the corresponding European Patent Application No. 13191764.3.

POLARIZING FILM, ANTI-REFLECTIVE FILM AND DISPLAY DEVICE INCLUDING THE SAME

CROSS-REFERENCE TO RELATED APPLICATION

This application claims priority to Korean Patent Application No. 10-2012-0125028, filed on Nov. 6, 2012, and all the benefits accruing therefrom under 35 U.S.C. §119, the content of which in its entirety is herein incorporated by reference.

BACKGROUND

1. Field

The disclosure relates to an anti-reflective film and a display device including the anti-reflective film.

2. Description of the Related Art

A display device, such as a liquid crystal display ("LCD") and an organic light emitting diode ("OLED"), for example, typically includes a polarizing plate provided on an outer surface of a display panel thereof. The polarizing plate only transmits light of a specific wavelength range and substantially absorbs or reflects light outside of the specific wavelength range, such that the polarizing plate may control the direction of incident light on the display panel or light emitted from the display panel.

The polarizing plate generally includes a polarizer and a protective layer for the polarizer. The polarizer may include, for example, iodine or a dichroic dye, which is adsorbed and arranged in polyvinyl alcohol ("PVA"), and the protective layer may include, for example, triacetyl cellulose ("TAC").

Recently, a polarizing film that does not include a protective layer has been researched. Such a polarizing film may be combined with a compensation film, and may function as an anti-reflective film which effectively prevents reflection of external light.

SUMMARY

Embodiments of the invention relate to an anti-reflective film with improved reflectance which improves visibility of a display device, and a display device including the anti-reflective film.

According to an embodiment, an anti-reflective film includes a polarizing film including a polymer and a plurality of dichroic dyes having an absorption wavelength region in a range of from about 380 nanometers (nm) to about 780 nanometers (nm), and a compensation film, where a reflective color of the anti-reflective film is substantially in a range of $-5 \leq a^* \leq 5$ and $-5 \leq b^* \leq 5$ in CIE-Lab color coordinates.

In an embodiment, the plurality of dichroic dyes may include a plurality of kinds of dichroic dyes having different absorption wavelength regions.

In an embodiment, the plurality of dichroic dyes may include at least two selected from: at least one of a first dichroic dye having a maximum absorption wavelength in a range of about 380 nm to about 490 nm, at least one of a second dichroic dye having a maximum absorption wavelength in a range of more than about 490 nm and less than or equal to about 580 nm, and at least one of a third dichroic dye having a maximum absorption wavelength in a range of more than about 580 nm and less than or equal to about 780 nm.

In an embodiment, the plurality of dichroic dyes may include a compound represented by the Chemical Formula 1:

[Chemical Formula 1]

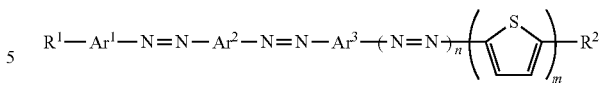

wherein, in Chemical Formula 1, $Ar^1$ to $Ar^3$ may be each independently a substituted or unsubstituted C6 to C15 arylene group, $R^1$ may be a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, or a combination thereof, $R^2$ may be hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, a substituted or unsubstituted amino group, or a combination thereof, and n and m may be independently 0 or 1.

In an embodiment, the compound represented by the Chemical Formula 1 may be at least one selected from a first dichroic dye having a maximum absorption wavelength in wavelength range of about 380 nm to about 490 nm, a second dichroic dye having a maximum absorption wavelength in wavelength range of more than about 490 nm and less than or equal to about 580 nm, and a third dichroic dye having a maximum absorption wavelength in wavelength range of more than about 580 nm and less than or equal to about 780 nm, depending on n, m, $R^1$ and $R^2$ of the Chemical Formula 1, the plurality of dichroic dyes may include the first dichroic dye and the second dichroic dye; the first dichroic dye and the third dichroic dye; the second dichroic dye and the third dichroic dye; at least two first dichroic dyes; at least two second dichroic dyes; at least two third dichroic dyes; or the first dichroic dye, the second dichroic dye and the third dichroic dye.

In an embodiment, the dichroic dye may be the first dichroic dye when n is 0 or 1 and m is 0, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, $-NR^3R^4$, or a combination thereof, wherein $R^3$ and $R^4$ are each independently hydrogen, a substituted or unsubstituted C1 to C10 alkyl group, or are linked to each other to form a ring;

the dichroic dye may be the second dichroic dye when n is 0 or 1 and m is 1, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring; and the dichroic dye may be the third dichroic dye when n and m are 1, respectively, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring; In an embodiment, the plurality of dichroic dyes may have n kinds of dichroic dyes, and the reflective color of the anti-reflective film may satisfy the following Relationship:

$$a^*_r = r_1 a^*_1 + r_2 a^*_2 + \ldots + r_n a^*_n; \text{ and}$$

$$b^*_r = r_1 b^*_1 + r_2 b^*_2 + \ldots + r_n b^*_n,$$

where $a^*_r$ and $b^*_r$ denote a* and b* components of the reflective color of the anti-reflective film in the CIE-Lab color coordinates, respectively, $a^*_1$ and $b^*_1$ denotes a* and b* components of a reflective color of a first reference polarizing film including a first kind of the n kinds of dichroic dyes at a reference weight in the CIE-Lab color coordinates, respectively, $a^*_2$ and $b^*_2$ denote a* and b* components of a reflective color of a second reference polarizing film including a second kind of the n kinds of dichroic dyes at the reference weight in the CIE-Lab color coordinates, respectively, $a^*_n$ and $b^*_n$ denote a* and b* components of a reflective color of an n-th reference polarizing film including an n-th kind of the n kinds of dichroic dyes at the reference weight in the CIE-Lab color coordinates, respectively, $r_1$ denotes a ratio of a weight of the first kind of the n kinds of dichroic dyes in the plurality of dichroic dyes with respect to the reference weight, $r_2$ denotes a ratio a weight of the second kind of the n kinds of dichroic dyes in the plurality of dichroic dyes with respect to a reference weight, and $r_n$ denotes a ratio a weight of the n-th kind of the n kinds of dichroic dyes in the plurality of dichroic dyes with respect to a reference weight.

In an embodiment, the plurality of dichroic dyes may be in an amount of about 0.01 to about 10 parts by weight based on 100 parts by weight of the polymer.

In an embodiment, the polymer may include a polyolefin, a polyamide, a polyester, a polyacryl, a polystyrene, a copolymer thereof, or a combination thereof.

In an embodiment, the polymer may include polyethylene (PE), polypropylene ("PP"), polyethylene terephthalate ("PET"), polyethylene terephthalate glycol ("PETG"), polyethylenenaphthalate ("PEN"), nylon, a copolymer thereof, or a combination thereof.

In an embodiment, the polarizing film may have a dichroic ratio in a range of about 2 to about 14 at a wavelength range of about 450 nm to about 550 nm, where the dichroic ratio may satisfy the following Equation:

$$DR = \text{Log}(1/T_\perp)/\text{Log}(1/T_\parallel),$$

where

DR denotes the dichroic ratio of the polarizing film, $T_\parallel$ denotes light transmittance of the polarization film regarding light polarized parallel to a transmissive axis of the polarization film, and $T_\perp$ denotes light transmittance of the polarization film regarding light polarized perpendicular to the transmissive axis of the polarization film.

In an embodiment, the polarizing film in the anti-reflective film may have a dichroic ratio in a range of from about 2 to about 14 in a wavelength range of about 380 nm to about 650 nm, where the dichroic ratio may satisfy the following Equation:

$$DR = \text{Log}(1/T_\perp)/\text{Log}(1/T_\parallel),$$

where

DR denotes the dichroic ratio of the polarizing film, $T_\parallel$ denotes light transmittance of the polarization film regarding light polarized parallel to a transmissive axis of the polarization film, and $T_\perp$ denotes light transmittance of the polarization film regarding light polarized perpendicular to the transmissive axis of the polarization film.

In an embodiment, the polarizing film may have light transmittance greater than or equal to about 30%.

In an embodiment, the anti-reflective film may have reflectance less than or equal to about 10%.

In an embodiment, the polarizing film may be a melt-blend of the polymer and the dichroic dye.

In an embodiment, the compensation film may be a $\lambda/4$ plate.

In an embodiment, a thickness of the polarizing film may be less than or equal to about 100 micrometers (μm).

According to another embodiment, a display device includes a display panel and an anti-reflective film disposed on a side of the display panel, where the anti-reflective film includes a polarizing film including a polymer and a plurality of dichroic dyes having an absorption wavelength region in a range of about 380 nm to about 780 nm, and a compensation film, where a reflective color of the anti-reflective film is substantially in a range of $-5 \leq a^* \leq 5$ and $-5 \leq b^* \leq 5$ in CIE-Lab color coordinates.

In an embodiment, the plurality of dichroic dyes may include a plurality of kinds of dichroic dyes having different absorption wavelength regions.

In an embodiment, the plurality of dichroic dyes may include at least two selected from at least one of a first dichroic dye having a maximum absorption wavelength in a range of about 380 nm to about 490 nm, at least one of a second dichroic dye having a maximum absorption wavelength in a range of more than about 490 nm and less than or equal to about 580 nm, and at least one of a third dichroic dye having a maximum absorption wavelength in a range of more than about 580 nm and less than or equal to about 780 nm.

In an embodiment, the plurality of dichroic dyes may include a compound represented by the above Chemical Formula 1.

In an embodiment, the plurality of dichroic dyes may include n kinds of dichroic dyes, and the reflective color of the anti-reflective film may satisfy the following relationship:

$$a^*_r = r_1 a^*_1 + r_2 a^*_2 + \ldots + r_n a^*_n; \text{ and}$$

$$b^*_r = r_1 b^*_1 + r_2 b^*_2 + \ldots + r_n b^*_n,$$

where a*$_r$ and b*$_r$ denote a* and b* components of the reflective color of the anti-reflective film in the CIE-Lab color coordinates, respectively, a*$_1$ and b*$_1$ denote a* and b* components of a reflective color of a polarizing film including a first kind of the n kinds of dichroic dyes at a reference weight in the CIE-Lab color coordinates, respectively, a*$_2$ and b*$_2$ denote a* and b* components of a reflective color of a polarizing film including a second kind of the n kinds of dichroic dyes at the reference weight in the CIE-Lab color coordinates, respectively, a*$_n$ and b*$_n$ denote a* and b* components of a reflective color of a polarizing film including an n-th kind of the n kinds of dichroic dyes at the reference weight in the CIE-Lab color coordinates, respectively, $r_1$ denotes a ratio of a weight of the first kind of the n kinds of dichroic dyes with respect to the reference weight, $r_2$ denotes a ratio of a weight of the second kind of the n kinds of dichroic dyes with respect to the reference weight, and $r_n$ denotes a of a weight of the n-th kind of the n kinds of dichroic dyes with respect to the reference weight.

In an embodiment, the plurality of dichroic dyes may include n kinds of dichroic dyes, and the reflective color of the display device may satisfy the following Relationship:

$$a^*_d = r_1 a^*_1 + r_2 a^*_2 + \ldots + r_n a^*_n + A; \text{ and}$$

$$b^*_d = r_1 b^*_1 + r_2 b^*_2 + \ldots + r_n b^*_n + B,$$

where a*$_d$ and b*$_d$ denote a* and b* components of the reflective color of the display device in the CIE-Lab color coordinates, respectively, a*$_1$ and b*$_1$ denote a* and b* components of a reflective color of a first reference polarizing film including a first kind of the n-kinds of dichroic dyes at a reference weight in the CIE-Lab color coordinates, respectively, a*$_2$ and b*$_2$ denote a* and b* components of a reflective color of a second reference polarizing film including a second kind of the n-kinds of dichroic dyes in the reference weight in the CIE-Lab color coordinates, respectively, a*$_n$ and b*$_n$ denote a* and b* components of a reflective color of an n-th reference polarizing film including an n-th kind of the n-kinds of dichroic dyes in the reference weight in the CIE-Lab color coordinates, respectively, $r_1$ denotes a ratio of a weight of the first kind of the n kinds of dichroic dyes in the plurality of dichroic dyes with respect to the reference weight, $r_2$ denotes a ratio of a weight of the second kind of the n kinds of dichroic dyes in the plurality of dichroic dyes with respect to the reference weight, $r_n$ denotes a ratio of a weight of the n-th kind of the n kinds of dichroic dyes in the plurality of dichroic dyes with respect to the reference weight, and A and B denote a* and b* components of a reflective color of the display panel in the CIE-Lab color coordinates, respectively.

In an embodiment, the polymer may include a polyolefin, a polyamide, a polyester, polyacryl, a polystyrene, a copolymer thereof, or a combination thereof.

In an embodiment, the polymer may include PE, PP, PET, PETG, PEN, nylon, a copolymer thereof, or a combination thereof.

In an embodiment, the polarizing film may have a dichroic ratio in a range of about 2 to 14 at a wavelength range of about 450 nm to about 550 nm, where the dichroic ratio may satisfy the following Equation:

$$DR = \text{Log}(1/T_\perp)/\text{Log}(1/T_\parallel),$$

where

DR denotes a dichroic ratio of the polarizing film, $T_\parallel$ denotes light transmittance of a polarization film regarding light polarized parallel to a transmissive axis of the polarization film, and $T_\perp$ denotes light transmittance of a polarization film regarding light polarized perpendicular to the transmissive axis of the polarization film.

In an embodiment, the polarizing film may have a dichroic ratio in a range of about 2 to about 14 at a wavelength in a range of about 380 nm to about 650 nm, where the dichroic ratio may satisfy the following Equation:

$$DR = \text{Log}(1/T_\perp)/\text{Log}(1/T_\parallel),$$

where

DR denotes a dichroic ratio of the polarizing film, $T_\parallel$ denotes light transmittance of a polarization film regarding light polarized parallel to a transmissive axis of the polarization film, and $T_\perp$ denotes light transmittance of a polarization film regarding light polarized perpendicular to the transmissive axis of the polarization film.

In an embodiment, the polarizing film may have light transmittance greater than or equal to about 30%.

In an embodiment, the polarizing film may be a melt-blend of the polymer and the dichroic dye.

In an embodiment, the display device may have reflectance less than or equal to about 10%.

In an embodiment, the compensation film may be a λ/4 plate.

In an embodiment, the display device may be an organic light emitting diode (OLED) display or a liquid crystal display (LCD).

In an embodiment, a thickness of the polarizing film is less than or equal to about 100 μm.

According to still another embodiment, a polarizing film includes a polymer and a plurality of dichroic dyes having an absorption wavelength region in a range of about 380 nm to about 780 nm, where a reflective color of the polarizing film is substantially in a range of $-5 \leq a^* \leq 5$ and $-5 \leq b^* \leq 5$ in CIE-Lab color coordinates, and a reflectance of the polarizing film is less than or equal to about 10%.

In an embodiment, the plurality of dichroic dyes may include at least two selected from at least one of a first dichroic dye having a maximum absorption wavelength in a range of about 380 nm to about 490 nm, at least one of a second dichroic dye having a maximum absorption wavelength in a range of more than about 490 nm and less than or equal to about 580 nm, and at least one of a third dichroic dye having a maximum absorption wavelength in a range of more than about 580 nm and less than or equal to about 780 nm.

In an embodiment, the plurality of dichroic dyes may include a compound represented by the above Chemical Formula 1:

In an embodiment, the plurality of dichroic dyes may include n kinds of dichroic dyes, and the reflective color of the polarizing film may satisfy the following Relationship:

$$a^*_p = r_1 a^*_1 + r_2 a^*_2 + \ldots + r_n a^*_n; \text{ and}$$

$$b^*_p = r_1 b^*_1 + r_2 b^*_2 + \ldots + r_n b^*_n$$

where $a^*_p$ and $b^*_p$ denote a* and b* components of the reflective color of the polarizing film in the CIE-Lab color coordinates, respectively, $a^*_1$ and $b^*_1$ denote a* and b* components of a reflective color of a first reference polarizing film including a first kind of the n kinds of dichroic dyes at a reference weight in the CIE-Lab color coordinates, respectively, $a^*_2$ and $b^*_2$ denote a* and b* components of a reflective color of a second reference polarizing film including a second kind of the n kinds of dichroic dyes at the reference weight in the CIE-Lab color coordinates, respectively, $a^*_n$ and $b^*_n$ denote a* and b* components of a reflective color of a third reference polarizing film including an n-th kind of the n kinds of dichroic dyes at the reference weight in the CIE-Lab color coordinates, respectively, $r_1$ denotes a ratio of a weight of the first kind of the n kinds of dichroic dyes in the plurality of dichroic dyes with respect to the reference weight, $r_2$ denotes a ratio of a weight of the second kind of the n kinds of dichroic dyes in the plurality of dichroic dyes with respect to the reference weight, and $r_n$ denotes a ratio of a weight of the n-th kind of the n kinds of dichroic dyes in the plurality of dichroic dyes with respect to the reference weight.

In an embodiment, the plurality of dichroic dyes may be in an amount of about 0.01 to about 10 parts by weight based on 100 parts by weight of the polymer.

In an embodiment, the polymer may include a polyolefin, a polyamide, a polyester, a polyacryl, a polystyrene, a copolymer thereof, or a combination thereof.

In an embodiment, the polymer may include PE, PP, PET, PETG, PEN, nylon, a copolymer thereof, or a combination thereof.

In an embodiment, the polarizing film may have light transmittance greater than or equal to about 30%.

In an embodiment, the polarizing film may be a melt-blend of the polymer and the dichroic dye.

In an embodiment, a thickness of the polarizing film may be less than or equal to about 100 μm.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
FIG. 1 is schematic cross-sectional view of an embodiment of an anti-reflective film.

The invention will be described more fully hereinafter with reference to the accompanying drawings, in which embodiments of the invention are shown. Embodiments of the invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

As used herein, when a definition is not otherwise provided, the term "substituted" refers to a compound or group substituted with at least one substituent selected from a halogen (F, Br, Cl, or I), a C1 to C20 alkoxy group, a cyano group, an amino group, a C1 to C20 ester group, a C1 to C20 alkyl group, a C2 to C20 alkenyl group, a C2 to C20 alkynyl group, a C1 to C20 aryl group, a C1 to C20 heteroaryl group, and a combination thereof, in place of at least one hydrogen of the compound or group.

Hereinafter, embodiments of the invention will be described in further detail with reference to the accompanying drawings.

Hereinafter, an embodiment of an anti-reflective film according to one embodiment is described.

Figure 2:
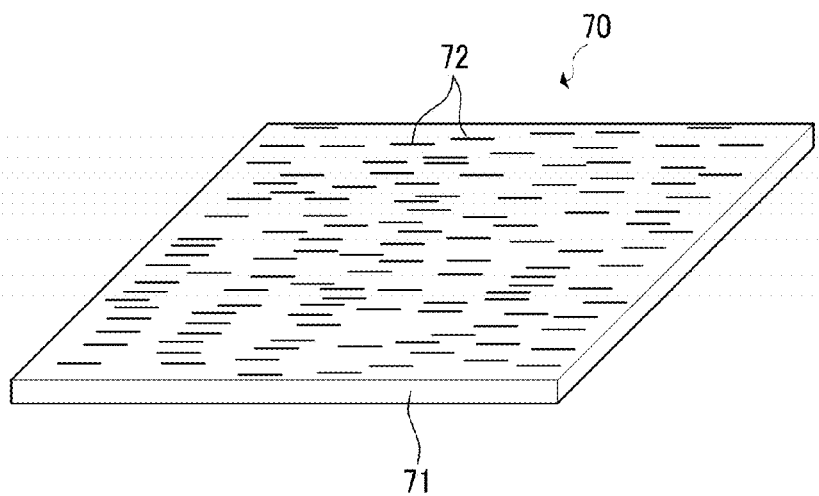
FIG. 2 is schematic perspective view of an embodiment of a polarizing film

FIG. 1 is a schematic cross-sectional view of an embodiment of an anti-reflective film, and FIG. 2 is a schematic perspective view of an embodiment of a polarizing film.

Referring to FIG. 1, an embodiment of an anti-reflective film 65 according to the invention includes a compensation film 60 and a polarizing film 70 disposed on the compensation film 60, e.g., attached to a surface of the compensation film 60. The compensation film 60 may be a retardation film, for example, a waveplate including a λ/4 plate. The compensation film 60 may circularly polarize light passing through the polarizing film 70 and thereby cause retardation of the light such that absorption and/or reflection of the light at the compensation film 60 is changed.

Referring to FIG. 2, an embodiment of the polarizing film 70 includes a polymer 71 and a dichroic dye 72.

In an embodiment, the polymer 71 may include: a hydrophobic polymer, for example, a polyolefin such as polyethylene ("PE"), polypropylene ("PP") and a copolymer thereof; nylon and a polyamide such as an aromatic polyamide; a polyester such as polyethylene terephthalate ("PET"), polyethylene terephthalate glycol ("PETG"), and polyethylene naphthalate ("PEN"); a polyacrylic such as polymethyl (meth)acrylate; a polystyrene such as polystyrene ("PS") and an acrylonitrile-styrene copolymer; a polycarbonate; a vinyl chloride-based resin; a polyimide resin; a sulfone resin; a polyethersulfone resin; a polyether-etherketone resin; a polyphenylene sulfide resin; a vinyl alcohol resin; a vinylidene chloride resin; a vinyl butyral resin; an allyl resin; a polyoxymethylene resin; an epoxy resin; a copolymer thereof; or a combination thereof.

In one embodiment, the polymer 71 may include, for example, PE, PP, PET, PETG, PEN, nylon, a copolymer thereof, or a combination thereof.

In one embodiment, the polymer 71 may include, for example, at least two of PE, PP and a polyethylene-polypropylene ("PE-PP") copolymer. In one embodiment, for example, the polymer 71 may include a mixture of PP and a PE-PP copolymer.

In one embodiment, the polymer 71 may include the PP having a melt flow index ("MFI") in a range of about 0.1 gram per 10 minutes of flow time (g/10 min) to about 5 grams per 10 minutes of flow time (g/10 min), for example. Herein, the MFI is defined by an amount of a polymer in a melt state flowing per 10 minutes, and relates to viscosity of the polymer in a melt state. As the MFI of a polymer is lower, the polymer has a higher viscosity, and as the MFI of a polymer is higher, the polymer has a lower viscosity. When the PP has the MFI in the range of about 0.1 g/10 min to about 5 g/10 min, properties and workability of an embodiment of the polarizing film 70 including the PP may be effectively improved. In one embodiment, for example, the polymer 71 may include the polypropylene having a MFI in a range of from about 0.5 g/10 min to about 5 g/10 min.

In one embodiment, the polymer 71 may include the PE-PP copolymer including about 1 wt % to about 50 wt % of an ethylene group based on the total amount of the copolymer. In such an embodiment, where the polymer 71 of the polarizing film 70 includes the PE-PP copolymer including the ethylene group in an amount of about 1 wt % to about 50 wt % based on the total amount of the copolymer, phase separation of the PP and the PE-PP copolymer may be effectively prevented or substantially reduced, and an elongation ratio the PE-PP copolymer during elongation process may improve as well as the PE-PP copolymer may have a substantially high light transmittance and alignment, thereby improving polarization characteristics of an embodiment of the polarizing film 70. In one embodiment, for example, the polymer 71 may include the PE-PP copolymer including an ethylene group in an amount of about 1 wt % to about 25 wt % with respect to the total amount of the PE-PP copolymer.

In one embodiment, the polymer 71 may include the PE-PP copolymer having a MFI in a range of from about 5 g/10 min to about 15 g/10 min. In such an embodiment, where the polymer 71 may include the PE-PP copolymer having a MFI in a range of from about 5 g/10 min to about 15 g/10 min, properties and workability of an embodiment of the polarizing film 70 including the PE-PP copolymer may be effectively improved. In one embodiment, for example, the polymer 71 may include the PE-PP copolymer having a MFI in a range of from about 10 g/10 min to about 15 g/10 min.

In one embodiment, the polymer 71 may include the PP and the PE-PP copolymer in a weight ratio of about 1:9 to about 9:1. In such an embodiment, where the polymer 71 includes the PP and the PE-PP copolymer in the weight ratio of about 1:9 to about 9:1, the PP is effectively prevented from crystallizing and may have substantially high mechanical strength, and thus effectively improving the haze characteristic. In one embodiment, for example, the polymer 71 may include the PP and the PE-PP copolymer in a weight ratio of about 4:6 to about 6:4. In one embodiment, the polymer 71 may include the PP and the PE-PP copolymer in a ratio of about 5:5.

In one embodiment, the polymer 71 may have a MFI in a range from about 1 g/10 min to about 15 g/10 min. In such an embodiment, where the polymer 71 has a MFI within the range from about 1 g/10 min to about 15 g/10 min, the polymer 71 has a substantially high light transmittance by limiting formation of crystals therein, has a predetermined viscosity for fabricating a film, and thus has substantially improved workability. In one embodiment, for example, the polymer 71 may have a MFI in a range of from about 5 g/10 min to about 15 g/10 min.

In an embodiment, the polymer 71 may have haze less than or equal to about 5%. In such an embodiment, where the polymer 71 has haze less than or equal to about 5%, light transmittance is substantially increased, thereby improving optical properties thereof. In one embodiment, for example, the polymer 71 may have haze less than or equal to about 2%. In one alternative embodiment, for example, the polymer 71 may have haze in a range from about 0.5% to about 2%.

In one embodiment, the polymer 71 may have crystallinity less than or equal to about 50%. In such an embodiment, where the polymer 71 has crystallinity less than or equal to about 50%, the polymer 71 may have a substantially reduced haze and the optical properties thereof is substantially improved. In one embodiment, for example, the polymer 71 may have crystallinity in a range of about 30% to about 50%.

In one embodiment, the polymer 71 may have light transmittance greater than or equal to about 85% in a wavelength region of about 380 nanometers (nm) to about 780 nanometers (nm). In an embodiment, the polymer 71 may be substantially elongated in a predetermined direction. In one embodiment, for example, the polymer 71 may be substantially elongated in a longitudinal direction of the dichroic dye 72.

In an embodiment, the dichroic dye 72 is dispersed into the polymer 71 and aligned substantially in the elongation direction of the polymer 71. The dichroic dye 72 includes a material that transmits only one component of two perpendicular polarization components of light in a predetermined wavelength region.

In one embodiment, the dichroic dye 72 may include a plurality of dichroic dyes having different absorption wavelength regions from each other, e.g., different types of dichroic dyes. The plurality of dichroic dyes may be combined to have an absorption wavelength region including substantially the entire wavelength region of the visible light, e.g., a wavelength range from about 380 nm to about 780 nm.

In one embodiment, the dichroic dye 72 may include, for example, at least two selected from: at least one of a first dichroic dye having a maximum absorption wavelength of about 380 nm to about 490 nm, at least one of a second dichroic dye having a maximum absorption wavelength of more than about 490 nm and less than or equal to about 580 nm, and at least one of a third dichroic dye having a maximum absorption wavelength of more than about 580 nm and less than or equal to about 780 nm. In one embodiment, for example, the first, second, and third dichroic dyes may be a yellow dye, a magenta dye, and a cyan dye, respectively, but not being limited thereto.

In one embodiment, the dichroic dye 72 may be, for example, an azo-based compound, for example, an azo-based compound represented by the following Chemical Formula 1.

Chemical Formula 1

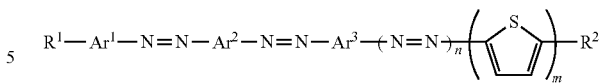

In Chemical Formula 1, $Ar^1$ to $Ar^3$ are each independently substituted or unsubstituted C6 to C15 arylene groups, $R^1$ is a substituted or unsubstituted C1 to C30 aliphatic organic group, a substituted or unsubstituted C3 to C8 cycloaliphatic group, a substituted or unsubstituted C6 to C30 aromatic organic group, a substituted or unsubstituted C1 to C30 hetero aliphatic organic group, a substituted or unsubstituted C3 to C30 hetero aromatic organic group, or a combination thereof, $R^2$ is hydrogen, a substituted or unsubstituted C1 to C30 aliphatic organic group, a substituted or unsubstituted C3 to C8 cycloaliphatic group, a substituted or unsubstituted C6 to C30 aromatic organic group, a substituted or unsubstituted C1 to C30 hetero aliphatic organic group, a substituted or unsubstituted C3 to C30 hetero aromatic organic group, a substituted or unsubstituted amino group, or a combination thereof, and n and m are independently 0 or 1.

In Chemical Formula 1, each of $Ar^1$ to $Ar^3$ may include, for example, a substituted or unsubstituted phenylene group, a substituted or unsubstituted naphthalene group, or a substituted or unsubstituted biphenylene group. Herein, the substituted phenylene group, the substituted naphthalene group, and the substituted biphenylene group may be substituted with, for example, a substituted or unsubstituted C1 to C20 alkyl group, a substituted or unsubstituted C1 to C20 alkoxy group, a halogen, a halogen-containing group, or a combination thereof.

In one embodiment, at least one of $Ar^1$ to $Ar^3$ may be a substituted phenylene group, a substituted naphthalene group, or a substituted biphenylene group, and for example at least one of $Ar^1$ to $Ar^3$ may be a phenylene group substituted by a substituted or unsubstituted C1 to C20 alkyl group, a substituted or unsubstituted C1 to C20 alkoxy group, a halogen, a halogen-containing group, or a combination thereof; a naphthalene group substituted by a substituted or unsubstituted C1 to C20 alkyl group, a substituted or unsubstituted C1 to C20 alkoxy group, a halogen, a halogen-containing group, or a combination thereof; or a biphenylene group substituted by a substituted or unsubstituted C1 to C20 alkyl group, a substituted or unsubstituted C1 to C20 alkoxy group, a halogen, a halogen-containing group, or a combination thereof.

In one embodiment, at least two of $Ar^1$ to $Ar^3$ may be a substituted phenylene group, a substituted naphthalene group, or a substituted biphenylene group, and for example at least two of $Ar^1$ to $Ar^3$ may be a phenylene group substituted by a substituted or unsubstituted C1 to C20 alkyl group, a substituted or unsubstituted C1 to C20 alkoxy group, a halogen, a halogen-containing group, or a combination thereof; a naphthalene group substituted by a substituted or unsubstituted C1 to C20 alkyl group, a substituted or unsubstituted C1 to C20 alkoxy group, a halogen, a halogen-containing group, or a combination thereof; or a biphenylene group substituted by a substituted or unsubstituted C1 to C20 alkyl group, a substituted or unsubstituted C1 to C20 alkoxy group, a halogen, a halogen-containing group, or a combination thereof.

In Chemical Formula 1, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, a substituted or unsubstituted C1 to C20 alkoxy group, a substituted or unsubstituted C1 to C20 thioalkyl group, $-NR^3R^4$, or a combination thereof, where $R^3$ and $R^4$ are independently hydrogen, a substituted or unsubstituted C1 to C10 alkyl group, or may be linked to each other to form a ring.

The compound represented by the Chemical Formula 1 may be at least one selected from a first dichroic dye having a maximum absorption wavelength in wavelength range of about 380 nm to about 490 nm, a second dichroic dye having a maximum absorption wavelength in wavelength range of more than about 490 nm and less than or equal to about 580 nm, and a third dichroic dye having a maximum absorption wavelength in wavelength range of more than about 580 nm and less than or equal to about 780 nm, depending on n, m, $R^1$ and $R^2$ of the Chemical Formula 1.

The plurality of dichroic dyes may include, for example, the first dichroic dye and the second dichroic dye; the first dichroic dye and the third dichroic dye; the second dichroic dye and the third dichroic dye; at least two first dichroic dyes; at least two second dichroic dyes; at least two third dichroic dyes; or the first dichroic dye, the second dichroic dye and the third dichroic dye.

For example, in Chemical Formula 1, the dichroic dye may be the first dichroic dye when n is 0 or 1 and m is 0; the dichroic dye may be the second dichroic dye when n is 0 or 1 and m is 1, the dichroic dye may be the third dichroic dye when n and m are 1, respectively.

For example, in Chemical Formula 1, when n and m are 1, respectively, the dichroic dye may be the second dichroic dye and/or the third dichroic dye, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, a substituted or unsubstituted C6 to C20 aryl group, $-NR^3R^4$, or a combination thereof, where $R^3$ and $R^4$ are independently hydrogen, a substituted or unsubstituted C1 to C10 alkyl group, or may be linked each other to form a ring.

In another embodiment, when n and m are 1, $R^1$ is a substituted or unsubstituted C1 to C20 alkoxy group or a substituted or unsubstituted C1 to C20 thioalkyl group, and $R^2$ is $-NR^3R^4$, where $R^3$ and $R^4$ are each independently hydrogen, substituted or unsubstituted C1 to C10 alkyl group, or are linked to each other to form a ring.

In one embodiment, $R^1$ may be a substituted or unsubstituted C1 to C20 alkoxy group or a substituted or unsubstituted C1 to C20 thioalkyl group; $R^2$ may be $-NR^3R^4$, where $R^3$ and $R^4$ may be linked each other to form a ring; and at least one $Ar^1$ to $Ar^3$ may be a substituted phenylene group, a substituted naphthalene group, a substituted biphenylene group, or a combination thereof, wherein the phenylene group, the naphthalene group, and the biphenylene group may be substituted by a substituted by a substituted or unsubstituted C1 to C20 alkyl group, a substituted or unsubstituted C1 to C20 alkoxy group, a halogen, a halogen-containing group, or a combination thereof, In one embodiment, $R^1$ may be a substituted or unsubstituted C1 to C20 alkoxy group or a substituted or unsubstituted C1 to C20 thioalkyl group; $R^2$ may be $-NR^3R^4$, where $R^3$ and $R^4$ may be linked each other to form a ring; and at least two $Ar^1$ to $Ar^a$ may be a substituted phenylene group, a substituted naphthalene group, a substituted biphenylene group, or a combination thereof, wherein the phenylene group, the naphthalene group, and the biphenylene group may be substituted by a substituted by a substituted C1 to C20 alkyl group, a substituted or unsubstituted C1 to C20 alkoxy group, a halogen, a halogen-containing group, or a combination thereof, In one embodiment, $R^1$ may be a substituted or unsubstituted C5 to C20 alkoxy group or a substituted or unsubstituted C5 to C20 thioalkyl group; $R^2$ may be $-NR^3R^4$, where $R^3$ and $R^4$ may be linked each other to form a ring The following Table 1 shows examples of the dichroic dye when n and m are 1, respectively.

TABLE 1

| Nos. | COMPOUND | Solubility Parameter |
|---|---|---|
| 1-1-1 | 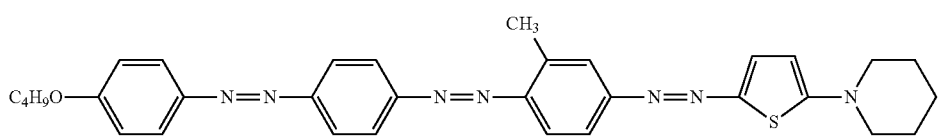 | 22.6 |
| 1-1-2 | 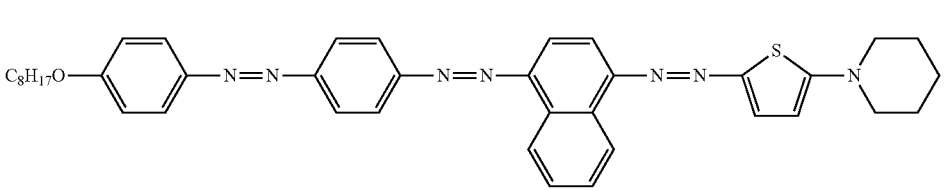 | 23.3 |

TABLE 1-continued
| Nos. | COMPOUND | Solubility Parameter |
|---|---|---|
| 1-1-3 |  | 23.1 |
| 1-1-4 | 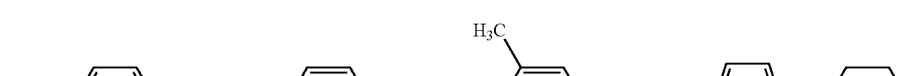 | 21.9 |
| 1-1-5 | 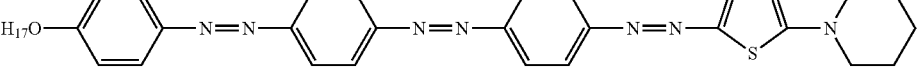 | 22.5 |
| 1-1-6 | 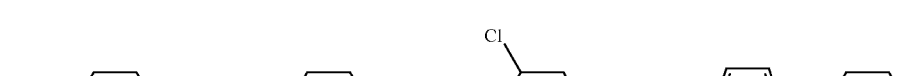 | 22.3 |
| 1-1-7 | 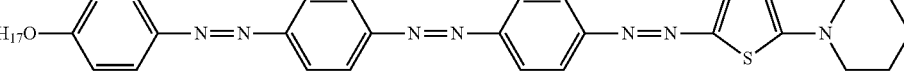 | 22.5 |
| 1-1-8 | 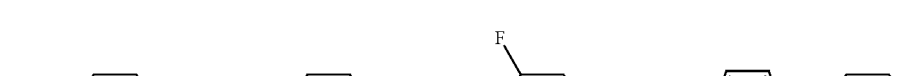 | 21.9 |
| 1-1-9 | 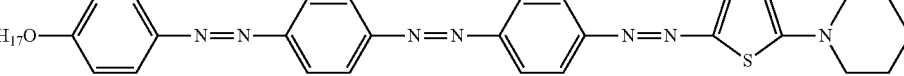 | 22.0 |
| 1-1-10 |  | 22.5 |
| 1-1-11 | 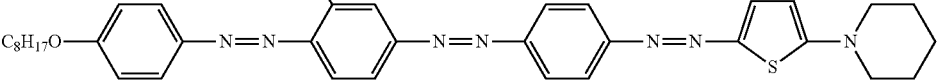 | 23.6 |
| 1-1-12 |  | 22.3 |

TABLE 1-continued

| Nos. | COMPOUND | Solubility Parameter |
|---|---|---|
| 1-1-13 | [structure] | 22.2 |
| 1-1-14 | [structure] | 22.8 |
| 1-1-15 | [structure] | 21.7 |
| 1-1-16 | [structure] | 22.2 |
| 1-1-17 | [structure] | 22.6 |
| 1-1-18 | [structure] | 22.1 |
| 1-1-19 | [structure] | 23.2 |

For example, in Chemical Formula 1, when n and m are 0, respectively, the dichroic dye may be the first dichroic dye, $R^1$ may be a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ may be hydrogen, a substituted or unsubstituted C1 to C30 alkyl group, $-NR^3R^4$, or a combination thereof, where $R^3$ and $R^4$ are independently hydrogen, a substituted or unsubstituted C1 to C10 alkyl group, or may be linked each other to form a ring.

In another embodiment, when n and m are 0, $R^1$ may be a substituted or unsubstituted C1 to C20 alkoxy group, a substituted or unsubstituted C1 to C20 thioalkyl group, or a substituted or unsubstituted C1 to C30 alkyl group, and $R^2$ may be hydrogen, a substituted or unsubstituted C1 to C30 alkyl group or $-NR^3R^4$, where $R^3$ and $R^4$ are each independently hydrogen, substituted or unsubstituted C1 to C10 alkyl group, or are linked to each other to form a ring.

The following Table 2 shows examples of the dichroic dye when n and m are 0, respectively.

TABLE 2

| Nos. | COMPOUND | Solubility Parameter |
|---|---|---|
| 1-2-1 | C$_4$H$_9$—⟨phenyl⟩—N=N—⟨phenyl⟩—N=N—⟨phenyl⟩—N(pyrrolidine) | 21.9 |
| 1-2-2 | C$_6$H$_{13}$O—⟨phenyl⟩—N=N—⟨naphthyl⟩—N=N—⟨phenyl⟩ | 23.4 |
| 1-2-3 | C$_6$H$_{13}$O—⟨phenyl (H$_3$C-substituted)⟩—N=N—⟨phenyl⟩—N=N—⟨phenyl⟩ | 21.4 |
| 1-2-4 | C$_7$H$_{15}$O—⟨phenyl (Cl-substituted)⟩—N=N—⟨phenyl⟩—N=N—⟨phenyl⟩—NMe$_2$ | 21.7 |
| 1-2-5 | C$_7$H$_{15}$O—⟨phenyl (Cl-substituted)⟩—N=N—⟨phenyl⟩—N=N—⟨phenyl⟩—NMe$_2$ | 21.7 |
| 1-2-6 | C$_3$H$_7$O—⟨phenyl⟩—N=N—⟨phenyl⟩—N=N—⟨phenyl⟩—C$_4$H$_9$ | 21.4 |

For example, in Chemical Formula 1, when n is 1 and m is 0, the dichroic dye may be the first dichroic dye, $R^1$ is a substituted or unsubstituted C1 to C30 alkyl group, a substituted or unsubstituted C1 to C20 alkoxy group, a substituted or unsubstituted C3 to C20 thioalkyl group, a substituted or unsubstituted C1 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ is hydrogen, a substituted or unsubstituted C1 to C30 alkyl group, a substituted or unsubstituted C6 to C30 aryl group, —NR$^3$R$^4$, or a combination thereof, where $R^3$ and $R^4$ are independently hydrogen, a substituted or unsubstituted C1 to C10 alkyl group, or are linked each other to form a ring.

In another embodiment, when n is 1 and m is 0, $R^1$ is a substituted or unsubstituted C1 to C20 alkoxy group, a substituted or a unsubstituted C1 to C20 thioalkyl group, or a substituted or unsubstituted C1 to C30 alkyl group, and $R^2$ is a substituted or unsubstituted C6 to C30 aryl group, —NR$^3$R$^4$, or a combination thereof, where $R^3$ and $R^4$ are independently hydrogen, a substituted or unsubstituted C1 to C10 alkyl group, or are linked each other to form a ring.

The following Table 3 shows examples of the dichroic dye when n is 1 and m is 0, respectively.

TABLE 3

| Nos. | COMPOUND | Solubility Parameter |
|---|---|---|
| 1-3-1 | C$_6$H$_{13}$O—⟨phenyl⟩—N=N—⟨phenyl⟩—N=N—⟨phenyl⟩—N=N—⟨phenyl⟩—NEt$_2$ | 21.7 |
| 1-3-2 | C$_6$H$_{13}$S—⟨phenyl⟩—N=N—⟨phenyl⟩—N=N—⟨phenyl⟩—N=N—⟨phenyl⟩—NEt$_2$ | 22.1 |

TABLE 3-continued

| Nos. | COMPOUND | Solubility Parameter |
|---|---|---|
| 1-3-3 | C₄H₉–⟨phenyl⟩–N=N–⟨phenyl⟩–N=N–⟨naphthyl⟩–N=N–⟨phenyl⟩–NEt₂ | 23.1 |
| 1-3-4 | C₆H₁₃O–⟨phenyl⟩–N=N–⟨phenyl⟩–N=N–⟨naphthyl⟩–N=N–⟨phenyl⟩–NEt₂ | 23.0 |
| 1-3-5 | C₆H₁₃S–⟨phenyl⟩–N=N–⟨phenyl⟩–N=N–⟨naphthyl⟩–N=N–⟨phenyl⟩–NEt₂ | 23.3 |
| 1-3-6 | C₈H₁₇O–⟨phenyl⟩–N=N–⟨phenyl(MeO)⟩–N=N–⟨phenyl⟩–N=N–⟨naphthyl⟩–NEt₂ | 22.6 |

In one embodiment, the dichroic dye 72 may have a decomposition temperature of greater than or equal to about 245° C. Herein, the decomposition temperature denotes a temperature where the dichroic dye 72 has about 5% less weight than the initial weight.

In the Tables 1 to 3, the solubility parameter illustrates an interaction degree to which two or more compounds interact. The smaller the solubility parameter difference the compounds have, the larger the interaction the compounds have therebetween, and the larger the solubility parameter difference the compounds have, the smaller the interaction the compounds have therebetween. The solubility parameter relates to the structure of compounds.

The polymer 71 may have a solubility parameter of, for example about 15 to about 19, and the solubility parameter difference of the polymer 71 and the dichroic dye 72 may be less than about 7.4. Without wishing to be bound by theory, when the dichroic dye 72 and the polymer 71 have a solubility parameter difference within the range, the polymer 71 and the dichroic dye 72 may have high interaction during the fabrication of a polarizing film, and may increase melt-blending property and thus may prevent agglomeration of the dichroic dyes 72 and uniformly disperse the dichroic dye 72 in the polymer 71. The solubility parameter difference of the polymer 71 and the dichroic dye 72 may be less than or equal to about 7.0, and specifically, less than or equal to about 6.7.

In one embodiment, the dichroic dye 72 may be included in an amount of about 0.01 to about 10 parts by weight based on 100 parts by weight of the polymer 71. In such an embodiment, where the dichroic dye 72 is in an amount of about 0.01 to about 10 parts by weight based on 100 parts by weight of the polymer 71, a sufficient polarizing characteristic may be secured without deteriorating light transmittance of the polarizing film. In one embodiment, for example, the dichroic dye 72 may be included in an amount of about 0.05 to about 5 parts by weight based on 100 parts by weight of the polymer 71.

In one embodiment, for example, the polarizing film 70 may have a dichroic ratio in a range from about 2 to about 14 at a wavelength range of about 450 nm to about 550 nm. In an alternative embodiment, the polarizing film 70 may have a dichroic ratio in a range of about 2 to about 14 at a wavelength range of about 380 nm to about 650 nm.

Herein, the dichroic ratio of the polarizing film 70 is obtained by dividing a polarizing absorption value in a direction parallel to an axis (e.g., an elongation axis) of a polymer thereof (or perpendicular to a transmissive axis of the polarizing film 70) by another polarizing absorption value in a direction perpendicular to the axis of the polymer thereof (or parallel to the transmissive axis of the polarizing film 70) according to the following Equation 1.

$$DR = \text{Log}(1/T_\perp)/\text{Log}(1/T_\parallel) \qquad \text{Equation 1}$$

In Equation 1,

DR denotes the dichroic ratio of a polarizing film 70, $T_\parallel$ denotes light transmittance of the polarization film 70 regarding light polarized parallel to the transmissive axis of the polarization film 70, and $T_\perp$ denotes light transmittance of the polarization film 70 regarding light polarized perpendicular to the transmissive axis of the polarization film 70.

The dichroic ratio relates to a degree of alignment of the dichroic dye 72 with respect to a predetermined direction in the polarizing film 70. In such an embodiment, where the polarizing film 70 has a dichroic ratio in the range of about 2 to about 14 at a predetermined wavelength range, the dichroic dye 72 are aligned substantially along an elongation axis of the polarizing film 70 (e.g., the alignment of a polymer chain or the axis of a polymer), and thus the polarizing film 70 may have decreased reflectance, e.g., may be less than or equal to about 10%, and the polarizing characteristic of the polarizing film 70 is thereby substantially improved.

Figure 3:
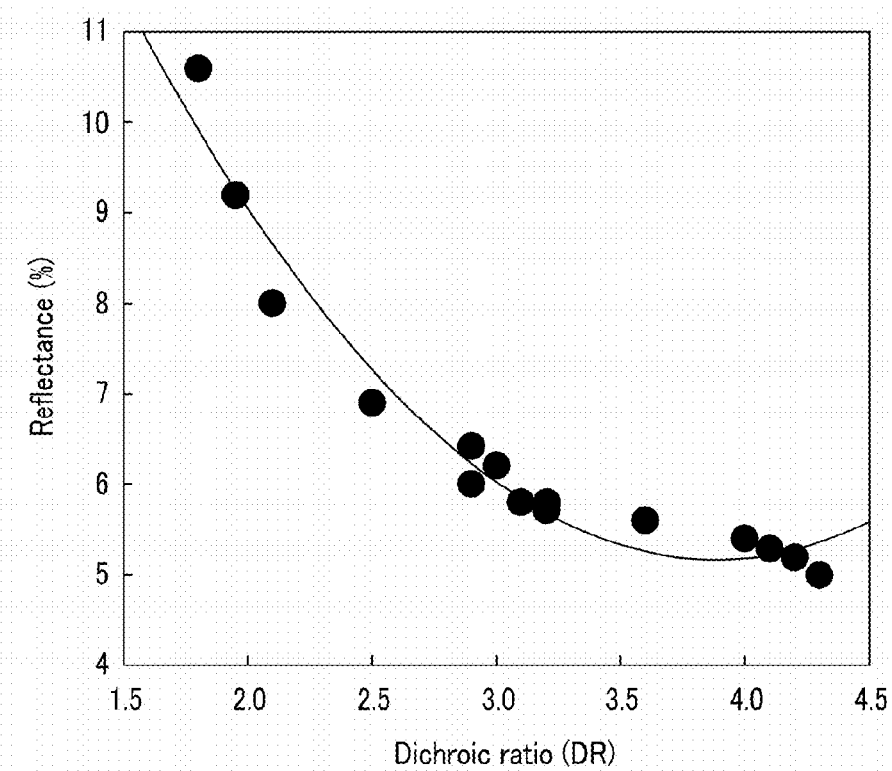
FIG. 3 is a graph showing a relationship between a dichroic ratio and reflectance of an embodiment of a polarizing film.

FIG. 3 is a graph showing a relationship between a dichroic ratio and reflectance of one embodiment of a polarizing film.

Referring to FIG. 3, an embodiment of the polarizing film 70 may have a reflectance less than or equal to about 10%, when the dichroic ratio thereof is greater than or equal to about 2 at a wavelength region from about 450 nm to about 550 nm.

In one embodiment, the polarizing film 70 may have a dichroic ratio greater than or equal to about 2.3 at the wavelength region from about 450 nm to about 550 nm, e.g., greater than or equal to about 2.5. As shown in the graph of FIG. 3, the higher the dichroic ratio is, the better the reflectance is. In such an embodiment, the dichroic ratio may be less than a predetermined value. In one embodiment, for example, the dichroic ratio may be less than or equal to about 20, less than or equal to about 14, less than or equal to about 10, less than or equal to about 8, or less than or equal to about 6.

In one embodiment, the polarizing film 70 may have reflectance less than or equal to about 9.0%, e.g., less than or equal to about 7.0%.

In one embodiment, the polarizing film 70 may have light transmittance greater than or equal to about 30%, e.g., about 30% to about 95%. When the polarizing film 70 has light transmittance greater than or equal to about 30%, light may be effectively prevented from being released from a display device, when applied on one surface of the display device.

The polarizing film 70 may include a melt-blend of the polymer 71 and the dichroic dye 72. In an embodiment of a method of manufacturing a polarizing film, the melt-blend may be obtained by mixing the polymer 71 and the dichroic dye 72 at a temperature greater than or equal to the melting point of the polymer.

In one embodiment of a method of manufacturing a polarizing film, for example, the polarizing film 70 may be fabricated by melt-blending the polymer 71 and the dichroic dye 72 and elongating the melt-blend.

In one embodiment, the polarizing film 70 may be fabricated by, for example, melt-blending a composition including the polymer and the dichroic dye, providing the melt-blended composition in a mold, pressing the melt-blended composition into a sheet, and elongating the sheet in a predetermined direction (e.g., a uniaxial direction).

In such an embodiment, the melt-blending may be performed by melt-blending the polymer and dichroic dye at a temperature of, for example, less than or equal to about 300° C., or, at a temperature in a range of about 50° C. to about 300° C., for example.

In such an embodiment, the sheet formation may be performed by providing the melt-blended composition in the mold and compressing the melt-blended composition with a high pressure or discharging the molten mixture in a chill roll through a T-die.

In such an embodiment, the elongation in the predetermined direction may be performed at a temperature in a range of from about 30° C. to about 200° C. in an elongation ratio in a range of from about 300% to about 1,000%. Herein, the elongation ratio denotes a ratio of a length of the sheet before the elongation with respect to the length of the sheet after the elongation.

In an embodiment, the polarizing film 70 may have a thickness less than or equal to about 100 micrometers (μm), for example, a thickness in a range of about 30 μm to about 95 μm. In such an embodiment, where the polarizing film 70 has a thickness less than or equal to about 100 μm, the polarizing film 70 is relatively thinner than a polarizing plate including a protective layer such as triacetyl cellulose ("TAC"), and thus a thickness of a display device including such an embodiment may be substantially reduced.

Referring back to FIG. 1, the anti-reflective film 65 may be disposed on a side of a display device, e.g., one side or two opposing sides of a display device. In one embodiment, for example, the anti-reflective film 65 may be disposed on a surface of a screen of the display device such that reflection of light from outside (hereinafter referred to as "external light") is effectively prevented, and visibility deterioration due to the reflection of the external light is thereby effectively prevented.

Figure 4:
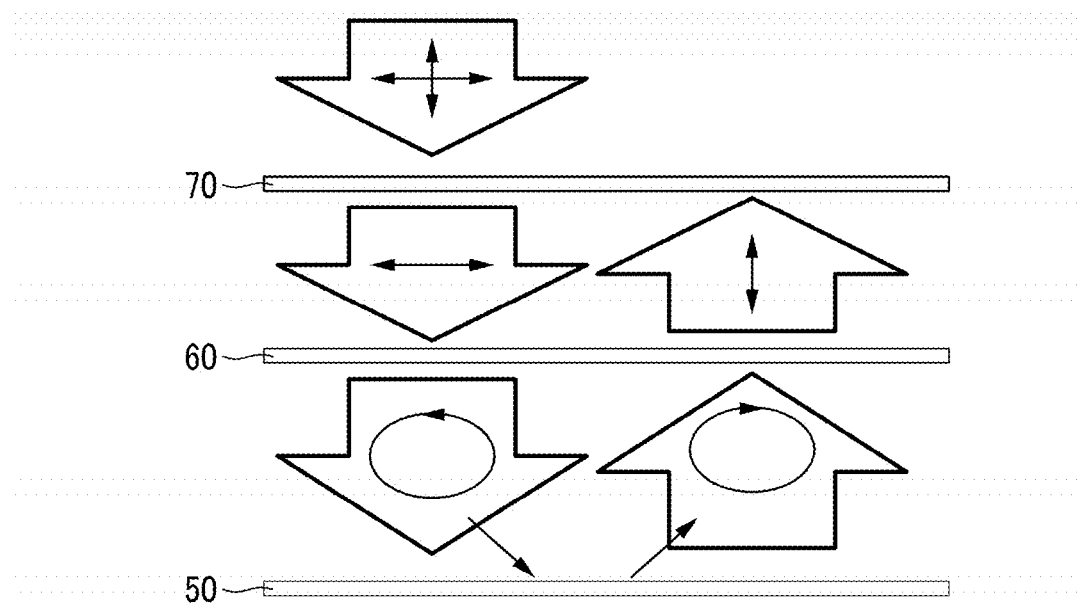
FIG. 4 is a schematic diagram showing the anti-reflection principle of a polarizing film.

FIG. 4 is a schematic view showing the external light anti-reflection principle of a polarizing film.

Referring to FIG. 4, when incident unpolarized light passes through the polarizing film 70, one polarizing perpendicular component of two polarizing perpendicular components, e.g., a first polarizing component, is transmitted through the polarizing film 70, while polarized light passes through the compensation film 60 such as a λ/4 plate and may be changed into circularly polarized light. The circularly polarized light is reflected in the display panel 50 including a substrate, an electrode, and the like, and the direction of the circularly polarized light is changed. When the circularly polarized light, the direction of which is changed, passes through the compensation film 60 again, the compensation film 60 transmits the other polarizing perpendicular component of the two polarizing perpendicular components, e.g., a second polarizing component, which is perpendicular to the first polarizing component. The second polarizing component may not pass through the polarizing film 70 and is not transmitted out of the display device, thus effectively preventing the reflection of external light.

The reflection of external light may be expressed based on a reflective color. The reflective color may be represented using CIE-Lab color coordinates.

Figure 5:
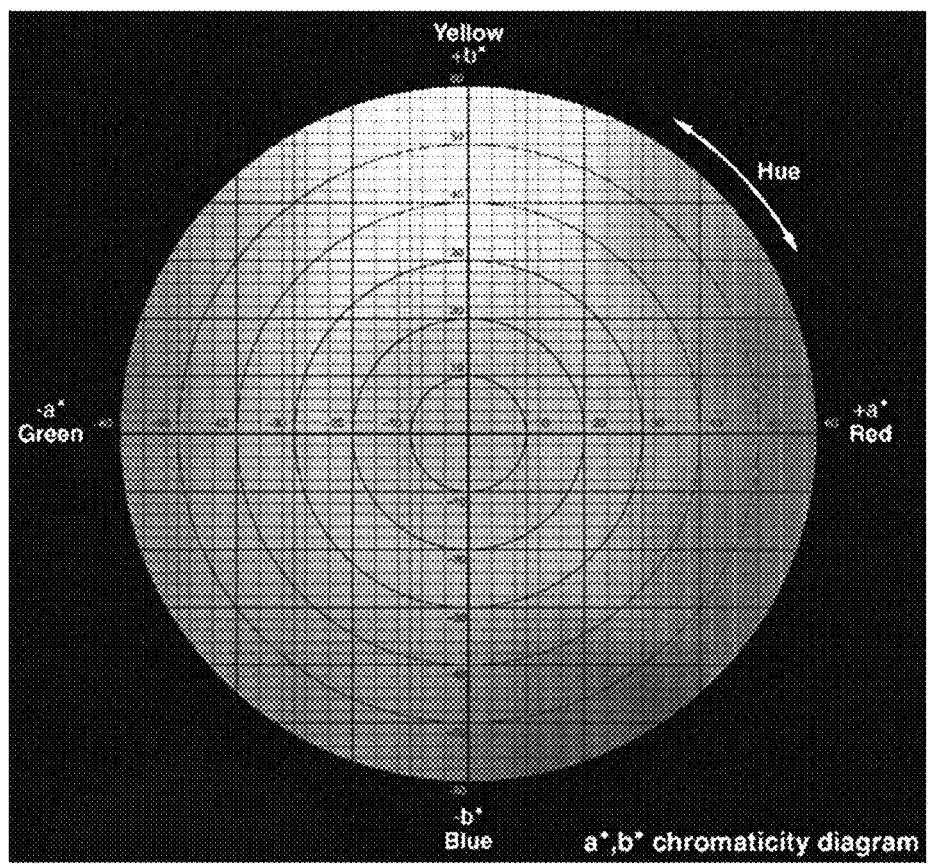
FIG. 5 is a chromaticity diagram showing CIE-Lab color coordinates.

FIG. 5 is a chromaticity diagram showing the CIE-Lab color coordinates.

In FIG. 5, $a^*$ component of the CIE-Lab color coordinates is in a horizontal axis, and $b^*$ component of the CIE-Lab color coordinates is in a vertical axis. The positive value $a^*$ denotes red, the negative value $a^*$ denotes green, the positive value $b^*$ denotes yellow, and the negative value $b^*$ denotes blue. In the CIE-Lab color coordinates, the larger the absolute values of $a^*$ and $b^*$ are, the stronger the colors corresponding thereto are.

According to one embodiment of the invention, the anti-reflective film 65 has a reflective color substantially in a range of $-5 \leq a^* \leq 5$ and $-5 \leq b^* \leq 5$ in the CIE-Lab color coordinates. The reflective color may be substantially neutral gray in the range of about $-5 \leq a^* \leq 5$ and $-5 \leq b^* \leq 5$ in the CIE-Lab color coordinates. In such an embodiment, where the anti-reflective film 65 has the reflective color substantially in the range of $-5 \leq a^* \leq 5$ and $-5 \leq b^* \leq 5$ in the CIE-Lab color coordinates, the reflection of the anti-reflective film 65 is substantially reduced and the visibility of the anti-reflective film 65 is substantially improved. In an embodiment, where the anti-reflective film 65 has the reflective color substantially in the range of $-5 \leq a^* \leq 5$ and $-5 \leq b^* \leq 5$ in the CIE-Lab color coordinates, reflectance of the anti-reflective film 65 may be less than or equal to about 10%, for example.

The reflective color of the anti-reflective film 65 may be determined based on the dichroic dye 72, and may be adjusted by combining various kinds of dichroic dyes. In one embodiment, for example, where the dichroic dye 72 includes n kinds of dichroic dyes, the reflective color of the anti-reflective film 65 may satisfy the following Relationship 1.

$$a^*_r = r_1 a^*_1 + r_2 a^*_2 + \ldots + r_n a^*_n$$

$$b^*_r = r_1 b^*_1 + r_2 b^*_2 + \ldots + r_n b^*_n \qquad \text{Relationship 1}$$

In Relationship 1, $a^*_r$ and $b^*_r$ denote a* and b* components of the reflective color of the anti-reflective film 65 including the mixture of n kinds of dichroic dyes in the CIE-Lab color coordinates, respectively, $a^*_1$ and $b^*_1$ denote a* and b* components of a reflective color of a first reference polarizing film including a first kind of the n kinds of dichroic dyes at a reference weight in the CIE-Lab color coordinates, respectively, $a^*_2$ and $b^*_2$ denote a* and b* components of a reflective color of a second reference polarizing film including a second kind of the n kinds of dichroic dyes at the reference weight in the CIE-Lab color coordinates, respectively, $a^*_n$ and $b^*_n$ denote a* and b* components of a reflective color of an n-th reference polarizing film including an n-th kind of the n kinds of dichroic dyes at the reference weight in the CIE-Lab color coordinates, respectively, $r_1$ denotes a ratio of a weight of the first kind of the n kinds of dichroic dyes in the anti-reflective film with respect to the reference weight, $r_2$ denotes a ratio of a weight of the second kinds of the n kinds of dichroic dyes in the anti-reflective film with respect to the reference weight, and $r_n$ denotes a ratio of a weight of the n-th kind of the n kinds of dichroic dyes in the anti-reflective film with respect to the reference weight.

Here, the first to n-th reference polarizing films is substantially the same as the polarizing film including the n kinds of dichroic dyes except that the first to n-th reference polarizing films include only first to n-kinds of the n kinds of dichroic dyes, respectively, among the n kinds of dichroic dyes.

In such an embodiment, the reflective colors and the ratios of n kinds of dichroic dyes are not limited to specific colors and ratios. In such an embodiment, the reflective colors and the ratios of the n kinds of dichroic dyes may be variously modified based on to the Relationship 1 such that the anti-reflective film 65 including the mixture of n kinds of dichroic dyes has the reflective color substantially in the range of $-5 \leq a^*_r \leq 5$ and $-5 \leq b^*_r \leq 5$ in the CIE-Lab color coordinates.

The anti-reflective film 65 may be included in various display devices.

The display device including the anti-reflective film 65 may be, for example, an organic light emitting diode ("OLED") display or a liquid crystal display ("LCD"), but not being limited thereto.

According to one embodiment of the invention, the display device includes a display panel and an embodiment of the anti-reflective film disposed on the display panel, e.g., at least one surface of the display panel.

In such an embodiment, the display panel may include two substrates and an active layer disposed therebetween, and may be a liquid crystal display panel or an organic light emitting display panel, for example.

In an embodiment, the display panel may include an anti-reflective film including a compensation film and a polarizing film as described above. The compensation film may be a retardation film such as a waveplate including a λ/4 plate, for example, and the polarizing film may include a melt-blend of the polymer and a plurality of dichroic dyes having an absorption wavelength region in a range from about 380 nm to about 780 nm. In the melt-blend of the polymer and the dichroic dyes, the dichroic dyes are homogeneously dissolved and/or dispersed in the polymer. The anti-reflective film may be substantially the same as the embodiments described above.

In such an embodiment, the display device may have a reflective color substantially in a range of $-5 \leq a^* \leq 5$ and $-5 \leq b^* \leq 5$ in CIE-Lab color coordinates. Herein, the reflective color of the display device is defined as a reflective color from a side of the display device where the anti-reflective film is disposed, and may show characteristics of the reflected external light. In such an embodiment, the reflective color of the display device is substantially in the range of $-5 \leq a^* \leq 5$ and $-5 \leq b^* \leq 5$ in CIE-Lab color coordinates, the reflective color of the display device may be substantially neutral gray, and thus the reflection of external light is substantially reduced and the visibility of the display device is substantially improved.

In an embodiment, the anti-reflective film of the display device may include a mixture of n kinds of dichroic dyes. The n may be a natural number, and the n may be 2 to 10. In such an embodiment, the reflective color of the display device may satisfy the following Relationship 2.

$$a^*_d = r_1 a^*_1 + r_2 a^*_2 + \ldots + r_n a^*_n + A$$

$$b^*_d = r_1 b^*_1 + r_2 b^*_2 + \ldots + r_n b^*_n + B \qquad \text{Relationship 2}$$

In Relationship 2, $a^*_d$ and $b^*_d$ denote a* and b* components of the reflective color of a display device in the CIE-Lab color coordinates, respectively, $a^*_1$ and $b^*_1$ denote a* and b* components of a reflective color of a first reference polarizing film including a first kind of the n kinds of dichroic dyes at a reference weight in the CIE-Lab color coordinates, respectively, $a^*_2$ and $b^*_2$ denote a* and b* components of a reflective color of a second reference polarizing film including a second kind of the n kinds of dichroic dyes at the reference weight in the CIE-Lab color coordinates, respectively, $a^*_n$ and $b^*_n$ denote a* and b* components of a reflective color of an n-th reference polarizing film including an n-th kind of the n kinds of dichroic dyes at the reference weight in the CIE-Lab color coordinates, respectively, $r_1$ denotes a ratio of a weight of the first kind of the n kinds of dichroic dyes in the display device with respect to the reference weight, $r_2$ denotes a ratio of a weight of the second kind of the n kinds of dichroic dyes in the display device with respect to the reference weight, $r_n$ denotes a ratio of a weight of the n-th kind of the n kinds of dichroic dyes in the display device with respect to the reference weight, and A and B denote a* and b* components of a reflective color of a display panel of the display device in the CIE-Lab color coordinates, respectively.

The reflective color of a display panel, e.g., A and B, may include reflective colors of all constituent elements having a reflective color, such as an electrode, a wire, a substrate, and the like disposed on the display panel.

In such an embodiment, the reflective colors and the ratios of the n kinds of dichroic dyes are not limited to specific colors and ratios. In such an embodiment, the reflective colors and the ratios of the n kinds of dichroic dyes may be variously modified based on the Relationship 2 such that the display device including the anti-reflective film has the reflective color substantially in the range of $-5 \leq a^*_d \leq 5$ and $-5 \leq b^*_d \leq 5$ in the CIE-Lab color coordinates. In such an embodiment, the display device may have a reflective color substantially in a range of $-5 \leq a^*_d \leq 5$ and $-5 \leq b^*_d \leq 5$ by combining the reflective color of the anti-reflective film and the reflective color of the display panel. When the reflective color of the display device is substantially in the range of $-5 \leq a^*_d \leq 5$ and $-5 \leq b^*_d \leq 5$, the display device may have substantially low reflectance, e.g., reflectance of less than or equal to about 10%, and thus the reflection of external light is substantially reduced and the visibility of the display panel is substantially improved.

Hereinafter, an embodiment of the display device, where the display device is an OLED display, will now be described with reference to FIG. 6.

Figure 6:
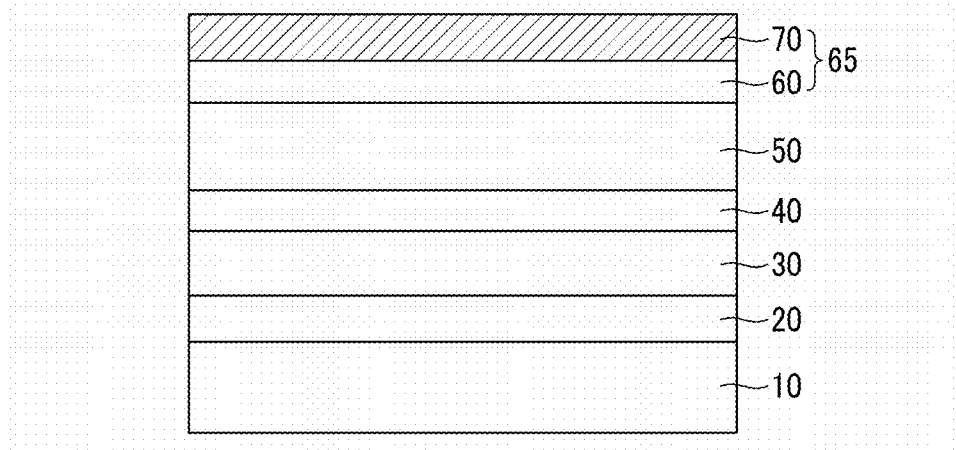
FIG. 6 is a schematic cross-sectional view of an embodiment of an organic light emitting diode ("OLED") display.

FIG. 6 is a schematic cross-sectional view showing an embodiment of an OLED display.

Referring to FIG. 6, an embodiment of an organic light emitting display includes a base substrate 10, a lower electrode 20, an organic emission layer 30, an upper electrode 40, an encapsulation substrate 50 and an anti-reflective film 65. The anti-reflective film 65 includes a phase retardation film 60 and a polarizing film 70.

The base substrate 10 may include a silicon wafer, glass or plastic, for example.

In such an embodiment, one of the lower electrode 20 and the upper electrode 40 may be an anode, and the other of the lower electrode 20 and the upper electrode 40 may be a cathode. The anode is an electrode into which holes are injected, and may include a transparent conductive material that has a high work function and transmits emitted light, for example, indium tin oxide ("ITO") or indium zinc oxide ("IZO"). The cathode is an electrode in which electrons are accepted, and may be include a conductive material having a low work function and substantially no influence on an organic material, for example, aluminum (Al), calcium (Ca), and barium (Ba).

The organic emission layer 30 includes an organic material that emits light when the lower electrode 20 and the upper electrode 40 are applied with a voltage.

In an embodiment, an auxiliary layer (not shown) may be disposed between the lower electrode 20 and the organic emission layer 30 and between the upper electrode 40 and the organic emission layer 30. The auxiliary layer may include a hole transport layer, a hole injection layer ("HIL"), an electron injection layer ("EIL"), and an electron transport layer to balance electrons and holes.

The encapsulation substrate 50 may include glass, a metal or a polymer, and may cover or seal the lower electrode 20, the organic emission layer 30 and the upper electrode 40 to effectively prevent moisture and/or oxygen from flowing therein.

The anti-reflective film 65 may be disposed at the side where light is emitted. In an embodiment, where the display device is a bottom emission type in which light is emitted toward the base substrate 10, the anti-reflective film 65 may be disposed at an outer surface of the base substrate 10. In an alternative embodiment, where the display device is a top emission type in which light is emitted toward the encapsulation substrate 50, the anti-reflective film 65 may be disposed at an outer surface of an encapsulation substrate 50. In another embodiment, where the display device a both-face emission type in which light is emitted toward the base substrate 10 and the encapsulation substrate 50, the anti-reflective film 65 may be disposed at outer surfaces of the base substrate 10 and the encapsulation substrate 50.

The anti-reflective film 65 shown in FIG. 6 may include the compensation film 60 and the polarizing film 70 as in the embodiments described above, and thus detailed description thereof will hereinafter be omitted.

Hereinafter, embodiments of the invention will be described in greater detail with reference to various examples. However, the embodiments of the invention are not limited to the examples described herein.

Synthesis of Dichroic Dye

Synthesis Example 1

Dye 1-1-5 in Table 1

1-1. Synthesis of Monoazo Compound 10 g (41.1 mmol) of 4-(4-nitrophenylazo)phenol (TCI, Japan) is dissolved in 200 mL of acetone, and 8.5 mL (48.9 mmol) of 1-bromooctane and 11.4 g (82.5 mmol) of potassium carbonate ($K_2CO_3$) are added thereto. The reaction mixture is refluxed and agitated at 60° C. for 24 hours and then cooled down to room temperature. The agitated mixture is concentrated and purified through silica gel column chromatography ($CH_2Cl_2$:n-hexane=2:1), obtaining 12.3 g (34.6 mmol) of a 4-nitro compound. The compound has a yield of 84%. 5.7 g (16.0 mmol) of the 4-nitro compound is dissolved in 150 mL of hot ethanol, and a solution prepared by dissolving 11.5 g (47.9 mmol) of $Na_2S.9H_2O$ in hot ethanol and water is added thereto. The resulting mixture is agitated at 80° C. for 5 hours and cooled down to room temperature. Then, a precipitated crystal is filtered, washed several times with water, and dried, obtaining 4.3 g (13.2 mmol) of 4-amino-4'-octyloxyazobenzene. The obtained compound has a yield of 82%.

The 4-amino-4'-octyloxyazobenzene is analyzed by $^1H$ NMR (Bruker Co., 300 MHz).

The $^1H$ NMR analysis result is as follows.

$^1H$ NMR (300 MHz, $CDCl_3$) δ (ppm): 0.89 (t, J=6.9 Hz, 3 H, $CH_3$), 1.26-1.34 (m, 8 H, $CH_2 \times 4$), 1.45-1.49 (m, 2 H, $CH_2$), 1.57-1.83 (m, 2 H, $CH_2$), 3.98 (br s, 2H, $NH_2$), 4.02 (t, J=6.6 Hz, 2H, $OCH_2$), 6.74 (d, J=8.9 Hz, 2H, ArH), 6.97 (d, J=8.9 Hz, 2H, ArH), 7.76 (d, J=8.9 Hz, 2H, ArH), 7.82 (d, J=8.9 Hz, 2H, ArH).

1-2. Synthesis of Bisazo Compound 2 g (6.15 mmol) of the 4-amino-4'-octyloxyazobenzene is dissolved in 120 mL of dimethyl acetamide (DMAc) and 30 mL of acetic acid (AcOH). 3 mL of 12N HCl is added thereto. The mixture is maintained at 0° C. Then, 446 mg (6.46 mmol) of sodium nitrate ($NaNO_2$) is dissolved in 2 mL of water to prepare a solution. The solution is slowly added in a dropwise fashion to the reaction mixture. When the addition is complete, the reactant is agitated for one hour while maintained at 0° C. Next, a solution prepared by dissolving 6.15 mmol of 3-chloroaniline in 150 mL of methanol is slowly added in a dropwise fashion to the agitated reactants. The resulting mixture is agitated at 0° C. Then, the agitated mixture is naturalized with a sodium hydroxide (NaOH) aqueous solution. When the reaction is complete, a precipitated solid therein is filtered. The remaining mixture is purified through silica gel column chromatography, obtaining a bisazo compound. The compound has a yield ranging from 60 to 80%.

1-3. Synthesis of Triazo Compound 1 mmol of the bisazo compound is dissolved in 20 mL of dimethyl acetamide (DMAc) and 5 mL of acetic acid (AcOH), and 0.5 mL of 12N HCl is added thereto. The mixture is maintained at 0° C. Next, a solution prepared by dissolving 72 mg (1.04 mmol) of sodium nitrate ($NaNO_2$) in 1 mL of water is slowly added in a dropwise fashion to the reaction mixture. When the addition is complete, the reactant is agitated for one hour while maintained 0° C. Next, a solution prepared by dissolving 167 mg (1 mmol) of 2-piperidinothiophene in 25 mL of methanol is slowly added in a dropwise fashion to the reaction mixture. The resulting mixture is agitated at 0° C. for one hour. The agitated mixture is naturalized with a sodium hydroxide (NaOH) aqueous solution. When the reaction is complete, a precipitated solid is filtered. The remaining mixture is purified through silica gel column chromatography (n-hexane:EtOAc=3:1), obtaining 456 mg (0.71 mmol) of a dye 1-1-5 in Table 1.

The dye 1-1-5 is analyzed by $^1$H NMR. The $^1$H NMR analysis result is as follows.

$^1$H NMR (300 MHz, CDCl$_3$) δ (ppm): 0.90 (t, J=6.7 Hz, 3 H, CH$_3$), 1.25-1.38 (m, 8 H, CH$_2$×24), 1.45-1.49 (m, 2 H, CH$_2$), 1.71-1.86 (m, 8 H, CH$_2$×24), 3.46-3.50 (m, 4 H, NCH$_2$×22), 4.06 (t, J=6.4 Hz, 2H, OCH$_2$), 6.24 (d, J=4.8 Hz, 1 H, ArH), 7.02 (d, J=9.0 Hz, 2 H, ArH), 7.61-8.12 (m, 10 H, ArH).

The dye 1-1-5 has a solubility parameter of 22.5.

Synthesis Example 2

Dye 1-1-1 in Table 1

357 g (0.63 mmol) of a dye 1-1-1 in Table is prepared according to the same method as Synthesis Example 1, except for using 4-amino-4'-butyloxyazobenzene instead of 4-amino-4'-octyloxyazobenzene. The dye 1-1-1 has a yield of 63%.

The dye 1-1-1 is analyzed by $^1$H NMR. The $^1$H NMR analysis result is as follows.

$^1$H NMR (300 MHz, CDCl$_3$) δ (ppm): 1.00 (t, J=7.2 Hz, 3 H, CH$_3$), 1.47-1.59 (m, 2 H, CH$_2$), 1.70-1.86 (m, 8 H, CH$_2$×24), 2.80 (s, 3 H, CH$_3$), 3.43-3.46 (m, 4 H, NCH$_2$×22), 4.06 (t, J=6.4 Hz, 2 H, OCH$_2$), 6.19 (d, J=4.3 Hz, 1H, ArH), 7.02 (d, J=8.5 Hz, 2 H, ArH), 7.57-8.07 (m, 10 H, ArH).

The dye 1-1-1 has a solubility parameter of 22.6.

Synthesis Example 3

Dye 1-1-2 in Table 1

494 mg (0.75 mmol) of a dye 1-1-2 is prepared according to the same method as Synthesis Example 1, except for using 1-naphthylamine instead of 3-chloroaniline. The dye 1-1-2 has a yield of 75%.

The dye 1-1-2 is analyzed by $^1$H NMR. The $^1$H NMR analysis result is as follows.

$^1$H NMR (300 MHz, CDCl$_3$) δ (ppm): 0.90 (t, J=6.9 Hz, 3 H, CH$_3$), 1.22-1.36 (m, 8 H, CH$_2$×24), 1.45-1.50 (m, 2 H, CH$_2$), 1.73-1.85 (m, 8 H, CH$_2$×24), 3.48-3.52 (m, 4 H, NCH$_2$×22), 4.06 (t, J=6.6 Hz, 2 H, OCH$_2$), 6.24 (d, J=4.7 Hz, 1 H, ArH), 7.02 (d, J=9.0 Hz, 2 H, ArH), 7.63-8.19 (m, 11 H, ArH), 8.93 (d, J=8.8 Hz, 1 H, ArH), 9.04 (d, J=8.8 Hz, 1 H, ArH).

The dye 1-1-2 has a solubility parameter of 23.3.

Synthesis Example 4

Dye 1-2-6 in Table 2

A dye 1-2-6 in Table 2 is prepared according to the same method as Synthesis Example 1, except for using 4-amino-4'-butylazobenzene instead of 4-amino-4'-octyloxyazobenzene and phenol instead of 3-chloroaniline along with a sodium hydroxide aqueous solution and then, propylbromide.

The dye 1-2-6 is analyzed by $^1$H NMR. The $^1$H NMR analysis result is as follows.

$^1$H NMR (300 MHz, CDCl$_3$) δ (ppm): 0.95 (t, J=7.3 Hz, 3 H, CH$_3$), 1.07 (t, J=7.3 Hz, 3 H, CH$_3$), 1.34-1.43 (m, 2 H, CH$_2$), 1.58-1.66 (m, 2 H, CH$_2$), 1.82-1.89 (m, 2 H, CH$_2$), 2.70 (t, J=7.7 Hz, 2 H, ArCH$_2$), 4.01 (t, J=6.6 Hz, 2 H, OCH$_2$), 7.01 (d, J=9.0 Hz, 2 H, ArH), 7.33 (d, J=8.4 Hz, 2 H, ArH), 7.86-8.02 (m, 8 H, ArH).

The dye 1-2-6 has a solubility parameter of 21.4.

Synthesis Example 5

Dye 1-2-5 in Table 2

A dye 1-2-5 in Table 2 is prepared according to the same method as Synthesis Example 1, except for using 4-amino-4'-N,N-dimethylazobenzene instead of 4-amino-4'-octyloxyazobenzene and 3-chlorophenol instead of 3-chloroaniline along with a sodium hydroxide aqueous solution and then, heptyl bromide.

The dye 1-2-5 is analyzed by $^1$H NMR. The $^1$H NMR analysis result is as follows.

$^1$H NMR (400 MHz, CDCl$_3$) δ (ppm): 0.93 (t, J=7.0 Hz, 3 H, CH$_3$), 1.28-1.42 (m, 6 H, CH$_2$×23), 1.46-1.52 (m, 2 H, CH$_2$), 1.81-1.88 (m, 2 H, CH$_2$), 3.14 (s, 6 H, CH$_3$×22), 4.05 (t, J=6.6 Hz, 2 H, OCH$_2$), 6.80 (d, J=9.2 Hz, 2 H, ArH), 6.89 (dd, J=9.2, 2.8 Hz, 1 H, ArH), 7.10 (d, J=2.8 Hz, 1 H, ArH), 7.82-8.08 (m, 7 H, ArH).

The dye 1-2-5 has a solubility parameter of 21.7.

Reflection Color of Dichroic Dye

Five kinds of dichroic dyes satisfying characteristics in the following Table 4 are prepared.

TABLE 4

| | Light absorption ranges (nm) | $\lambda_{max}$ | a* | b* | Reflectance (%) |
|---|---|---|---|---|---|
| Yellow-1 | 380-490 | 455 | 3.4 | 47.5 | 25.0 |
| Yellow-2 | 350-440 | 380 | −5.3 | 21.0 | 32.0 |
| Magenta-1 | 490-580 | 535 | 8.6 | −28.8 | 6.4 |
| Magenta-2 | 490-580 | 550 | 10.2 | −25.5 | 5.5 |
| Cyan | 580-680 | 595 | 12.4 | −16.3 | 5.0 |

The five dichroic dyes are respectively mixed with a polymer to prepare compositions, and each composition is respectively used to fabricate polarizing films. Characteristics of each polarizing film are evaluated to evaluate characteristics of each dichroic dye.

The polarizing films are prepared using a composition, in which 0.5 parts by weight (e.g., a reference weight) of one of the five dichroic dyes are mixed with 100 parts by weight of a polymer prepared by mixing PP and a PP-PE in a ratio of about 50:50 (w/w). The five dichroic dyes satisfying characteristics in the above Table 4 may be selected from the dyes in Tables 1 to 3. For example, Yellow-1 may be a dye 1-2-6 in Table 2 obtained the Synthesis Example 4, Yellow-2 may be a dye 1-2-5 in Table 2 obtained the Synthesis Example 5, Magenta-1 may be a dye 1-1-1 in Table 1 obtained the Synthesis Example 2, Magenta-2 may be a dye 1-1-5 in Table 1 obtained the Synthesis Example 1, and Cyan may be a dye 1-1-2 in Table 1 obtained the Synthesis Example 3

The composition for a polarizing film is melt-blended at about 250° C. with a micro-compounder (Royal DSM). The melt-blended composition is put in a sheet-shaped mold and pressed with a high pressure at a high temperature, such that a film is fabricated. The film is about 1,000% elongated in a predetermined direction at about 115° C. using an elongation tester (Instron® Co.) to fabricate a polarizing film. The polarizing film is measured regarding light absorption range and a wavelength at which a maximum absorbance is observed ($\lambda_{max}$) using a spectrophotometer (V-7100, JASCO, Inc.).

The polarizing films fabricated using the five dichroic dye, respectively, are laminated with a circular polarizing compensation film (e.g., λ/4 plate) to fabricate an anti-reflective film. The circular polarizing compensation film is a WRS film (Teijin Co.). The transmission axis of the polarizing film is arranged at about 45° with respect to the optical axis of the circular polarizing compensation film and laminated therewith using an optical adhesive.

Then, an organic light emitting display panel is fabricated by sequentially laminating a metallic anode on a first substrate including a glass material and then an organic emission layer including a light emitting material, a cathode including a transparent or semi-transparent conductive material, and a second substrate. The circular polarizing compensation film of the anti-reflective film is arranged to face the second substrate of the display panel and is then attached thereto, such that an OLED display is fabricated. The OLED display is evaluated regarding reflective color and reflectance using a spectrophotometer (CM-3600d, Konica Minolta Inc.) after supplying the polarizing film with light under a condition of reflectance of 8° and optic receiver of 2° with a light source D65 (e.g., CIE Standard Illuminant D65). The reflective colors, e.g., a* and b* components in the CIE-Lab coordinates, are measured regarding the polarizing films respectively including the dichroic dyes using the spectrophotometer, as shown in Table 4.

Fabrication of Polarizing Film

Preparation Examples 1-17

A composition for a polarizing film is prepared by mixing a polymer (solubility parameter: 16.6) prepared by mixing PP and a PP-PE in a ratio of 50:50 (w/w) and the dichroic dye in a ratio provided in the following Table 5. The following mixing ratio is expressed as a ratio of parts by weight of the dichroic dye relative to 100 parts by weight of the polymer.

The composition for a polarizing film is melt-blended at about 250° C. using a micro-compounder (DSM). The melt-blended composition is put in a sheet-shaped mold and pressed with a high pressure at a high temperature to fabricate a film. The film is about 1,000% elongated in a predetermined direction at 115° C. with an elongation tester (Instron® Co.), such that a polarizing film is fabricated.

TABLE 5

| | Yellow-1 | Yellow-2 | Magenta-1 | Magenta-2 | Cyan |
|---|---|---|---|---|---|
| Preparation Example 1 | 0.40% | 0.05% | — | 0.08% | 0.15% |
| Preparation Example 2 | 0.40% | 0.10% | — | 0.10% | 0.20% |
| Preparation Example 3 | 0.05% | 0.15% | 0.10% | — | 0.25% |
| Preparation Example 4 | 0.10% | 0.10% | 0.10% | — | 0.25% |
| Preparation Example 5 | 0.10% | 0.15% | 0.10% | — | 0.25% |
| Preparation Example 6 | 0.22% | 0.17% | 0.10% | — | 0.30% |
| Preparation Example 7 | 0.30% | 0.15% | — | 0.20% | 0.20% |
| Preparation Example 8 | 0.22% | 0.22% | 0.10% | — | 0.30% |

TABLE 5-continued

| | Yellow-1 | Yellow-2 | Magenta-1 | Magenta-2 | Cyan |
|---|---|---|---|---|---|
| Preparation Example 9 | 0.22% | 0.32% | 0.10% | — | 0.30% |
| Preparation Example 10 | 0.30% | 0.25% | — | 0.20% | 0.30% |
| Preparation Example 11 | 0.22% | 0.27% | 0.10% | — | 0.30% |
| Preparation Example 12 | 0.30% | 0.25% | — | 0.20% | 0.30% |
| Preparation Example 13 | 0.10% | — | 0.10% | — | 0.25% |
| Preparation Example 14 | 0.05% | 0.05% | 0.10% | — | 0.25% |
| Preparation Example 15 | — | 0.18% | — | — | 0.42% |
| Preparation Example 16 | 0.25% | — | 0.05% | — | 0.35% |
| Preparation Example 17 | 0.05% | 0.05% | — | — | 0.40% |

Characteristics of Polarizing Film

The polarizing films according to Preparation Examples 1 to 14 are evaluated regarding light transmittance, polarizing efficiency and dichroic ratio.

The light transmittance is obtained by respectively measuring light transmittance ($T_{\parallel}$) of the polarizing film regarding light parallel to the transmission axis of the polarizing film and light transmittance ($T_{\perp}$) of the polarizing film regarding light perpendicular to the transmission axis of the polarizing film using a ultraviolet-visible ("UV-VIS") spectrophotometer (V-7100, JASCO Inc.). Herein, $T_{\parallel}$ and $T_{\perp}$ denote light transmittance in a wavelength range of visible light, e.g., in a wavelength range of from 380 nm to about 780 nm, measured with the UV-VIS spectrometer.

The light transmittance is used to obtain a dichroic ratio (DR) and polarizing efficiency (PE).

The dichroic ratio (DR) is obtained according to the following Equation 1.

$$DR = \text{Log}(1/T_{\perp})/\text{Log}(1/T_{\parallel}) \qquad \text{Equation 1}$$

In Equation 1,

DR is the dichroic ratio of a polarizing film, $T_{\parallel}$ is light transmittance of the polarization film regarding light parallel to the transmissive axis of the polarization film, and $T_{\perp}$ is light transmittance of a polarization film regarding light perpendicular to the transmissive axis of the polarization film.

$T_{\parallel}$ and $T_{\perp}$ may be measured using a UV-VIS spectrophotometer (V-7100, JASCO Inc.), as described above.

The polarizing efficiency is obtained according to the following Equation 2.

$$PE(\%) = [(T_{\parallel} - T_{\perp})/(T_{\parallel} - T_{\perp})]^{1/2} \times 100 \qquad \text{Equation 2}$$

In Equation 2,

PE is polarizing efficiency of a polarizing film, $T_{\parallel}$ is light transmittance of a polarization film regarding light parallel to the transmissive axis of the polarization film, and $T_{\perp}$ is light transmittance of a polarization film regarding light perpendicular to the transmissive axis of the polarization film.

$T_{\parallel}$ and $T_{\perp}$ may be measured using a UV-VIS spectrophotometer (V-7100, JASCO Inc.) as described above.

The measured light transmittance, and polarizing efficiency and dichroic ratio obtained based on the measured light transmittance of the polarizing films according to Preparation Examples 1 to 14 are shown in Table 6.

TABLE 6

| | Light transmittance (Ts, %) | Polarizing efficiency (PE, %) | Dichroic ratio (DR) | | |
|---|---|---|---|---|---|
| | | | 380-450 nm | 450-550 nm | 550-650 nm |
| Preparation Example 1 | 43.7 | 84.9 | 3.8 | 2.5 | 2.9 |
| Preparation Example 2 | 43.5 | 88.2 | 4.7 | 2.9 | 3.1 |
| Preparation Example 3 | 43.6 | 88.6 | 3.5 | 3.0 | 3.0 |
| Preparation Example 4 | 43.4 | 88.9 | 3.4 | 2.9 | 3.0 |
| Preparation Example 5 | 43.5 | 89.2 | 3.7 | 3.1 | 3.0 |
| Preparation Example 6 | 43.6 | 89.9 | 4.2 | 3.2 | 3.1 |
| Preparation Example 7 | 43.4 | 90.1 | 4.7 | 3.2 | 3.1 |
| Preparation Example 8 | 43.5 | 92.6 | 4.7 | 3.6 | 3.2 |
| Preparation Example 9 | 43.5 | 93.9 | 5.2 | 4.0 | 3.3 |
| Preparation Example 10 | 43.0 | 95.0 | 5.1 | 4.1 | 3.6 |
| Preparation Example 11 | 43.1 | 94.9 | 5.3 | 4.2 | 3.5 |
| Preparation Example 12 | 42.0 | 96.1 | 5.5 | 4.3 | 4.0 |
| Preparation Example 13 | 44.0 | 81.3 | 2.9 | 1.8 | 3.0 |
| Preparation Example 14 | 43.0 | 83.0 | 2.4 | 1.9 | 3.0 |

Referring to Table 6, the polarizing films according to Preparation Examples 1 to 14 have light transmittance of greater than or equal to about 30%, polarizing efficiency of greater than or equal to about 80%, and a dichroic ratio of greater than or equal to about 2.0 (at a wavelength range of about 450 nm to about 550 nm). In Table 6, a dichroic ratio at each wavelength denotes an average dichroic ratio in the corresponding wavelength range.

Fabrication of Anti-Reflective Film

Example 1-1

An anti-reflective film is fabricated by laminating the polarizing film of Preparation Example 1 and a circular polarizing compensation film (λ/4 plate). The circular polarizing compensation film is the WRS film (Teijin Co). The transmission axis of the polarizing film is arranged at about 45° with the optical axis of the circular polarizing compensation film, and both of the films are laminated together using an optical adhesive.

Examples 1-2 to 1-12

Anti-reflective films are fabricated according to the same method as Example 1-1, except for respectively using the polarizing films according to Preparation Examples 2 to 12 instead of the polarizing film according to Preparation Example 1.

Example 1-13

An anti-reflective film is fabricated according to the same method as Example 1-1, except for using the polarizing film according to Preparation Example 15 instead of the polarizing film according to Preparation Example 1.

Comparative Examples 1-1 and 1-2

Anti-reflective films are fabricated according to the same method as Example 1-1, except for respectively using the polarizing films according to Preparation Examples 13 and 14 instead of the polarizing film according to Preparation Example 1.

Comparative Examples 1-3 and 1-4

Anti-reflective films are fabricated according to the same method as Example 1-1, except for respectively using the polarizing films according to Preparation Examples 16 and 17 instead of the polarizing film according to Preparation Example 1.

Fabrication of OLED Display 1

Example 2-1

An organic light emitting display panel is fabricated by sequentially laminating a metallic anode, an organic emission layer including a light emitting material, a cathode including a transparent or semitransparent conductive material, and a second substrate on a first substrate including a glass material. Then, the circular polarizing compensation film of the anti-reflective film according to Example 1-1 is disposed to face the second substrate of the organic light emitting display panel and is then adhered thereto, fabricating an OLED display.

Examples 2-2 to 2-12

OLED displays are fabricated according to the same method as Example 2-1, except for respectively using the anti-reflective films according to Examples 1-2 to 1-12 instead of the anti-reflective film according to Example 1-1.

Comparative Examples 2-1 and 2-2

OLED displays are fabricated according to the same method as Example 2-1, except for respectively using the anti-reflective films according to Comparative Examples 1-1 to 1-2 instead of the anti-reflective film according to Example 1-1.

Evaluation of Anti-Reflection Properties 1

OLED displays including the anti-reflective films according to Examples 1-1 to 1-12 and Comparative Examples 1-1 and 1-2 are evaluated regarding reflective color and reflectance by supplying the polarizing films with light under the condition of the reflectance of 8° and the optic receiver of 2° using a light source D65 and a spectrophotometer (CM-3600d, Konica Minolta Inc.).

Figure 7:
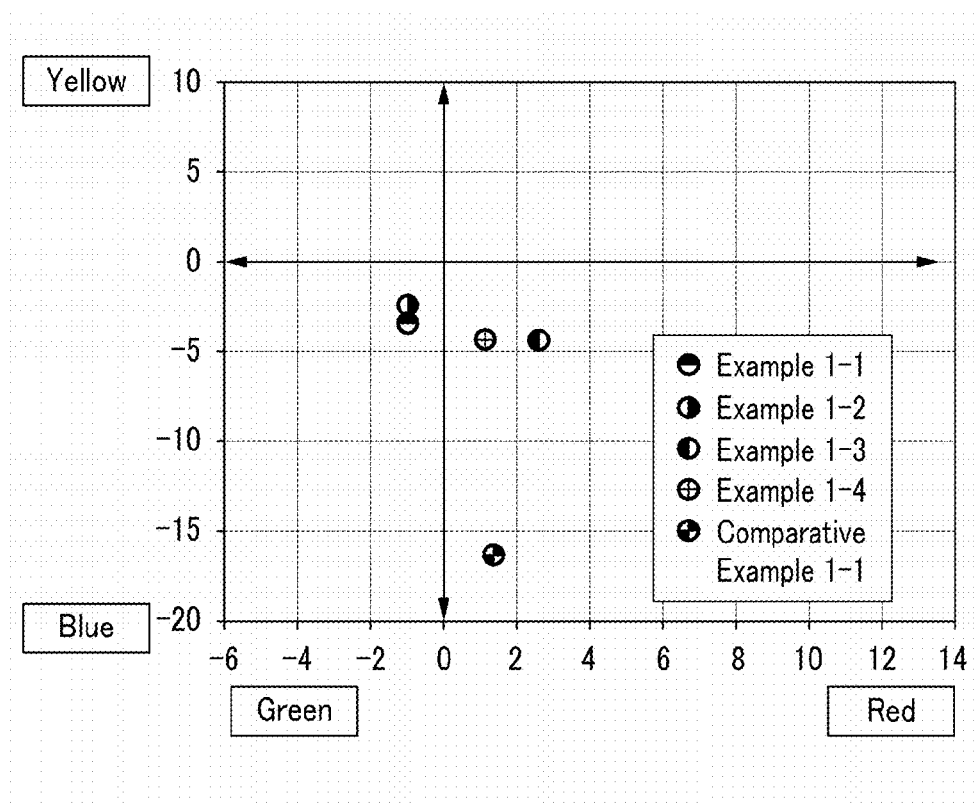
FIG. 7 is a graph showing reflective colors of exemplary embodiments and a comparative embodiment of an OLED display according to Examples 1-1 to 1-4 and Comparative Example 1-1.

The results of the evaluations are shown in FIG. 7 and Table 7.

FIG. 7 is a graph showing reflective colors of the anti-reflective films according to Examples 1-1 to 1-4 and Comparative Example 1-1

TABLE 7

| Anti-reflective film | a* | b* | Δa*b* | Reflectance (%) |
|---|---|---|---|---|
| Example 1-1 | −1.1 | −3.3 | 3.5 | 6.9 |
| Example 1-2 | −1.0 | −2.5 | 2.7 | 6.4 |
| Example 1-3 | 2.6 | −4.4 | 5.1 | 6.2 |
| Example 1-4 | 1.2 | −4.3 | 4.5 | 6.0 |
| Example 1-5 | 2.3 | −2.1 | 3.1 | 5.8 |
| Example 1-6 | 1.2 | −2.6 | 2.9 | 5.8 |

TABLE 7-continued

| Anti-reflective film | a* | b* | Δa*b* | Reflectance (%) |
|---|---|---|---|---|
| Example 1-7 | 2.8 | −2.5 | 3.8 | 5.7 |
| Example 1-8 | 2.1 | −0.8 | 2.2 | 5.6 |
| Example 1-9 | 2.6 | 0.4 | 2.6 | 5.4 |
| Example 1-10 | 2.3 | −1.6 | 2.8 | 5.3 |
| Example 1-11 | 2.0 | −0.8 | 2.2 | 5.2 |
| Example 1-12 | 1.8 | −2.4 | 3.0 | 5.0 |
| Comparative Example 1-1 | 1.4 | −16.3 | 16.4 | 10.6 |
| Comparative Example 1-2 | 5.6 | −6.8 | 8.8 | 9.1 |

$\Delta a^* b^* = \sqrt{a^{*2} + b^{*2}}$

Referring to FIG. 7 and Table 7, the anti-reflective films including the polarizing film according to Examples 1-1 to 1-12 have reflective colors substantially in a range of −5≤a*≤5 and −5≤b*≤5. In an embodiment, as described above, the anti-reflective film may be provided by mixing more than one dichroic dye each having a predetermined reflective color in various ratios as shown in Table 5 and controlling the dichroic ratio of the polarizing films.

In such an embodiment, the polarizing film having a reflective color substantially in a range of −5≤a*≤5 and −5≤b*≤5 has reflectance less than or equal to about 10%. As shown in FIG. 7, the anti-reflective film according to Comparative Example 1-1 includes a polarizing film having a low dichroic ratio, and thus the anti-reflective film according to Comparative Example 1-1 has a reflective color substantially outside of the range of −5≤a*≤5 and −5≤b*≤5, and relatively high reflectance.

Evaluation of Ambient Contrast Ratio

The OLED displays according to Examples 2-1 to 2-12 and Comparative Examples 2-1 and 2-2 are evaluated regarding ambient contrast ratio ("ACR").

The ambient contrast ratio is measured using ACR1201 (a detector SR3A) under illuminance of about 10,000 lux (lx). When an OLED has an increased higher ambient contrast ratio, external light reflection is more effectively prevented and the visibility of the OLED is substantially improved.

The results of measuring the ACR of the OLED displays according to Examples 2-1 to 2-12 and Comparative Examples 2-1 and 2-2 are shown in Table 8.

TABLE 8

| OLED display | ACR |
|---|---|
| Example 2-1 | 1.67 |
| Example 2-2 | 2.06 |
| Example 2-3 | 2.19 |
| Example 2-4 | 2.29 |
| Example 2-5 | 2.37 |
| Example 2-6 | 2.39 |
| Example 2-7 | 2.41 |
| Example 2-8 | 2.44 |
| Example 2-9 | 2.49 |
| Example 2-10 | 2.50 |
| Example 2-11 | 2.51 |
| Example 2-12 | 2.53 |
| Comparative Example 2-1 | 0.98 |
| Comparative Example 2-2 | 1.59 |

Referring to Table 8, the OLED displays according to Examples 2-1 to 2-12 have a higher ambient contrast ratios than the OLED displays according to Comparative Examples 2-1 and 2-2, and the visibility of the OLED displays according to Examples 2-1 to 2-12 is improved.

Fabrication of OLED Display 2

Example 2-13

An embodiment of an OLED panel is fabricated by sequentially disposing, e.g., laminating, a cathode including a metallic electrode material, an organic emission layer including a light emitting material, an anode including a transparent or semi-transparent conductive material, and a second substrate on a first substrate including a glass material. Then, an OLED display is fabricated by positioning the circular polarizing compensation film of the anti-reflective film according to Example 1-13 to face a second substrate of the display panel, which is opposite to the first substrate.

Comparative Examples 2-3 and 2-4

OLED displays are fabricated according to the same method as Example 2-13, except for respectively including the anti-reflective films according to Comparative Examples 1-3 and 1-4 instead of the anti-reflective film according to Example 1-13.

Evaluation of Anti-Reflection Properties 2

The OLED displays including the anti-reflective films according to Example 1-13 and Comparative Examples 1-3 and 1-4 are evaluated regarding reflective color and reflectance by supplying the polarizing films with light from a light source D65 under the condition of the reflectance of 8° and the optic receiver of 2° and using a spectrophotometer (CM-3600d, Konica Minolta Inc).

Figure 8:
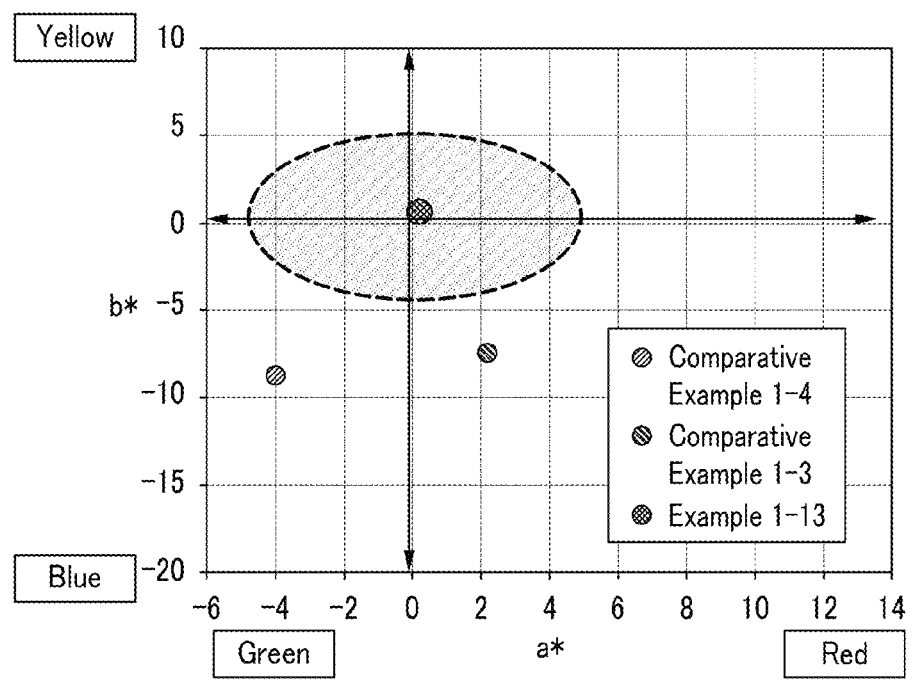
FIG. 8 is a graph showing reflective colors exemplary embodiments and comparative embodiments of OLED display according to Example 1-13 and Comparative Examples 1-3 and 1-4.

The results of the evaluations are shown in FIG. 8 and Table 9.

FIG. 8 is a graph showing reflective color of the anti-reflective films according to Example 1-13 and Comparative Examples 1-3 and 1-4

TABLE 9

| Anti-reflective film | a* | b* | Δa*b* | Reflectance (%) |
|---|---|---|---|---|
| Example 1-13 | 0.05 | 0.4 | 0.4 | 3.6 |
| Comparative Example 1-3 | 2.2 | −7.5 | 7.8 | 4.6 |
| Comparative Example 1-4 | −4.0 | −8.8 | 9.6 | 3.8 |

Referring to FIG. 8 and Table 9, the polarizing film included in the anti-reflective film according to Example 1-13 has a reflective color within a predetermined range, e.g., in a range of −5≤a*≤5 and −5≤b*≤5 in the CIE-Lab color coordinates, by including more than one dichroic dye having a predetermined reflective color in a ratio provided in Table 5. As shown in FIG. 8 and Table 9, the polarizing film in the anti-reflective films according to Comparative Examples 1-3 to 1-4 has a reflective color outside of the predetermined range, e.g., −5≤a*≤5 and −5≤b*≤5 in the CIE-Lab color coordinates.

FIG. 7 and Table 7 show anti-reflection properties of the anti-reflective films in a front light emitting display panel, while FIG. 8 and Table 9 show anti-reflection properties of the anti-reflective films in a rear light emitting display panel. Accordingly, an embodiment of an anti-reflective film that may be applied to various types of display panel are fabricated using a polarizing film including a plurality of dichroic dyes mixed therein and controlling the dichroic ratio of the polarizing film using the dichroic dyes based on reflective color and reflectance of the display panels.

Evaluation of Ambient Contrast Ratio 2

The OLED displays according to Example 2-13 and Comparative Examples 2-3 and 2-4 are evaluated regarding ACR.

The ambient contrast ratio is measured using ACR1201 (a detector SR3A) under illumination of about 150 lx. As described above, when an OLED has an increased higher ambient contrast ratio, external light reflection is more effectively prevented and the visibility of the OLED is substantially improved.

The results of the evaluations are shown in Table 10.

TABLE 10

| | ACR |
|---|---|
| Example 2-13 | 117.08 |
| Comparative Example 2-3 | 95.04 |
| Comparative Example 2-4 | 99.22 |

Referring to Table 10, the OLED display according to Example 2-13 has a higher ambient contrast ratio than the OLED displays according to Comparative Examples 2-3 to 2-4, and thus has improved visibility.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An anti-reflective film comprising:
   a polarizing film comprising:
      a polymer; and
      a plurality of dichroic dyes having an absorption wavelength region in a range from about 380 nanometers to about 780 nanometers; and
   a compensation film,
   wherein a reflective color of the anti-reflective film is substantially in a range of $-5 \leq a^*_r \leq 5$ and $-5 \leq b^*_r \leq 5$ in CIE-Lab color coordinates, wherein $a^*_r$ and $b^*_r$ denote a* and b* components of the reflective color of the anti-reflective film in the CIE-Lab color coordinates, respectively, and
   wherein the polymer comprises a polyolefin, a polyamide, a polyester, a polyacryl, a polystyrene, a copolymer therof, or a combination thereof.

2. The anti-reflective film of claim 1, wherein
   the plurality of dichroic dyes comprises a plurality of kinds of dichroic dyes having different absorption wavelength regions from one another.

3. The anti-reflective film of claim 2, wherein the plurality of dichroic dyes comprises at least two selected from:
   at least one kind of a first dichroic dye having a maximum absorption wavelength in a range from about 380 nanometers to about 490 nanometers;
   at least one kind of a second dichroic dye having a maximum absorption wavelength in a range of more than about 490 nanometers and less than or equal to about 580 nanometers; and
   at least one of a third dichroic dye having a maximum absorption wavelength in a range of more than about 580 nanometers and less than or equal to about 780 nanometers.

4. The anti-reflective film of claim 2, wherein the plurality of dichroic dyes comprise a compound represented by the Chemical Formula 1:

[Chemical Formula 1]

$$R^1-Ar^1-N=N-Ar^2-N=N-Ar^3-(N=N)_n-\left(\underset{}{\underset{S}{\bigcirc}}\right)_m-R^2$$

wherein, in Chemical Formula 1,
$Ar^1$ to $Ar^3$ are each independently a substituted or unsubstituted C6 to C15 arylene group,
$R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, or a combination thereof,
$R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, a substituted or unsubstituted amino group, or a combination thereof, and
n and m are independently 0 or 1.

5. The anti-reflective film of claim 4, wherein
the compound represented by the Chemical Formula 1 is at least one selected from a first dichroic dye having a maximum absorption wavelength in wavelength range of about 380nm to about 490nm, a second dichroic dye having a maximum absorption wavelength in wavelength range of more than about 490nm and less than or equal to about 580nm, and a third dichroic dye having a maximum absorption wavelength in wavelength range of more than about 580nm and less than or equal to about 780nm, depending on n, m, $R^1$ and $R^2$ of the Chemical Formula 1,
the plurality of the dichroic dyes comprise the first dichroic dye and the second dichroic dye; the first dichroic dye and the third dichroic dye; the second dichroic dye and the third dichroic dye; at least two first dichroic dyes; at least two second dichroic dyes; at least two third dichroic dyes; or the first dichroic dye, the second dichroic dye and the third dichroic dye.

6. The anti-reflective film of claim 5, wherein
the dichroic dye is the first dichroic dye when n is 0 or 1 and m is 0,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, $-NR^3R^4$, or a combination thereof, wherein $R^3$ and $R^4$ are each independently hydrogen, a substituted or unsubstituted C1 to C10 alkyl group, or are linked to each other to form a ring;
the dichroic dye is the second dichroic dye when n is 0 or 1 and m is 1,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ is hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring; and the dichroic dye is the third dichroic dye when n and m are 1, respectively, R is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and $R^2$ is hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring.

7. The anti-reflective film of claim 1, wherein the plurality of dichroic dyes comprises n kinds of dichroic dyes, wherein n is a natural number, and the reflective color of the anti-reflective film satisfies the following Relationship:

$$a^*_r = r_1 a^*_1 + r_2 a^*_2 + \ldots + r_n a^*_n; \text{ and}$$

$$b^*_r = r_1 b^*_1 + r_2 b^*_2 + \ldots + r_n b^*_n,$$

wherein $a^*_1$ and $b^*_1$ denotes a* and b* components of a reflective color of a first reference polarizing film including a first kind of the n kinds of dichroic dyes at a reference weight in the CIE-Lab color coordinates, respectively, $a^*_2$ and $b^*_2$ denote a* and b* components of a reflective color of a second reference polarizing film including a second kind of the n kinds of dichroic dyes at the reference weight in the CIE-Lab color coordinates, respectively, $a^*_n$ and $b^*_n$ denote a* and b* components of a reflective color of an n-th reference polarizing film including an n-th kind of the n kinds of dichroic dyes at the reference weight in the CIE-Lab color coordinates, respectively, $r_1$ denotes a ratio of a weight of the first kind of the n kinds of dichroic dyes in the plurality of dichroic dyes with respect to the reference weight, $r_2$ denotes a ratio a weight of the second kind of the n kinds of dichroic dyes in the plurality of dichroic dyes with respect to the reference weight, and $r_n$, denotes a ratio a weight of the n-th kind of the n kinds of dichroic dyes in the plurality of dichroic dyes with respect to the reference weight.

8. The anti-reflective film of claim 1, wherein the plurality of dichroic dyes is in an amount of about 0.01 part to about 10 parts by weight based on 100 parts by weight of the polymer.

9. The anti-reflective film of claim 1, wherein the polymer comprises polyethylene, polypropylene, polyethylene terephthalate, polyethylene terephthalate glycol, polyethylenenaphthalate, nylon, a copolymer thereof, or a combination thereof.

10. The anti-reflective film of claim 1, wherein the polarizing film has a dichroic ratio in a range of from about 2 to about 14 at a wavelength range of about 450 nanometers to about 550 nanometers, wherein the dichroic ratio satisfies the following Equation:

$$DR = \text{Log}(1/T_\perp)/\text{Log}(1/T_\parallel),$$

wherein DR denotes the dichroic ratio of the polarizing film, $T_\parallel$ denotes light transmittance of the polarization film regarding light polarized parallel to a transmissive axis of the polarization film, and $T_\perp$ denotes light transmittance of the polarization film regarding light polarized perpendicular to the transmissive axis of the polarization film.

11. The anti-reflective film of claim 1, wherein the polarizing film has a dichroic ratio in a range of from about 2 to about 14 at a wavelength range of about 380 nanometers to about 650 nanometers, wherein the dichroic ratio satisfies the following Equation:

$$DR = \text{Log}(1/T_\perp)/\text{Log}(1/T_\parallel),$$

wherein

DR denotes the dichroic ratio of the polarizing film, $T_\parallel$ denotes light transmittance of the polarization film regarding light polarized parallel to a transmissive axis of the polarization film, and $T_{195}$ denotes light transmittance of the polarization film regarding light polarized perpendicular to the transmissive axis of the polarization film.

12. The anti-reflective film of claim 1, wherein the polarizing film has light transmittance greater than or equal to about 30%.

13. The anti-reflective film of claim 1, wherein the anti-reflective film has reflectance less than or equal to about 10%.

14. The anti-reflective film of claim 1, wherein the polarizing film is a melt-blend of the polymer and the dichroic dye.

15. The anti-reflective film of claim 1, wherein the compensation film comprises a λ/4 plate.

16. The anti-reflective film of claim 1, wherein a thickness of the polarizing film is less than or equal to about 100 micrometers.

17. A display device comprising:

a display panel; and an anti-reflective film disposed on a surface of the display panel, wherein the anti-reflective film comprises:

a polarizing film comprising:

a polymer; and a plurality of dichroic dyes having an absorption wavelength region in a range of about 380 nanometers to about 780 nanometers; and a compensation film, and wherein a reflective color of the anti-reflective film is substantially in a range of $-5 \leq a^*_r \leq 5$ and $-5 \leq b^*_r \leq 5$ in CIE-Lab color coordinates, wherein $a^*_r$ and $b^*_r$ denote a* and b* components of the reflective color of the anti-reflective film in the CIE-Lab color coordinates, respectively, and wherein the polymer comprises a polyolefin, a polyamide, a polyester, a polyacryl, a polystyrene, a copolymer thereof, or a combination thereof.

18. The display device of claim 17, wherein the plurality of dichroic dyes comprises a plurality of kinds of dichroic dyes having different absorption wavelength regions from one another.

19. The display device of claim 18, wherein the plurality of dichroic dyes comprises at least two selected from:
at least one of a first dichroic dye having a maximum absorption wavelength in a wavelength region of about 380 nanometers to about 490 nanometers;
at least one of a second dichroic dye having a maximum absorption wavelength in a wavelength region of more than about 490 nanometers and less than or equal to about 580 nanometers; and
at least one of a third dichroic dye having a maximum absorption wavelength in a wavelength region of more than about 580 nanometers and less than or equal to about 780 nanometers.

20. The display device of claim 18, wherein the plurality of dichroic dyes comprise a compound represented by the Chemical Formula 1:

[Chemical Formula 1]

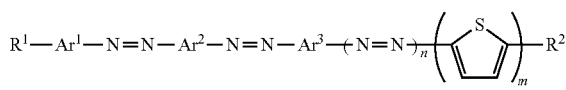

wherein, in Chemical Formula 1,
$Ar^1$ to $Ar^3$ are each independently a substituted or unsubstituted C6 to C15 arylene group,
$R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, or a combination thereof,
$R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, a substituted or unsubstituted amino group, or a combination thereof, and
n and m are independently 0 or 1.

21. The display device of claim 20, wherein
the compound represented by the Chemical Formula 1 is at least one selected from a first dichroic dye having a maximum absorption wavelength in wavelength range of about 380nm to about 490nm, a second dichroic dye having a maximum absorption wavelength in wavelength range of more than about 490nm and less than or equal to about 580nm, and a third dichroic dye having a maximum absorption wavelength in wavelength range of more than about 580 nm and less than or equal to about 780 nm, depending on n, m, $R^1$ and $R^2$ of the Chemical Formula 1,
the plurality of the dichroic dyes comprise the first dichroic dye and the second dichroic dye; the first dichroic dye and the third dichroic dye; the second dichroic dye and the third dichroic dye; at least two first dichroic dyes; at least two second dichroic dyes; at least two third dichroic dyes; or the first dichroic dye, the second dichroic dye and the third dichroic dye.

22. The display device of claim 21, wherein
the dichroic dye is the first dichroic dye when n is 0 or 1 and m is 0,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, $-NR^3R^4$, or a combination thereof, wherein $R^3$ and $R^4$ are each independently hydrogen, a substituted or unsubstituted C1 to C10 alkyl group, or are linked to each other to form a ring;
the dichroic dye is the second dichroic dye when n is 0 or 1 and m is 1,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C20 aryl group, $-NR^3R^4$, or a combination thereof, wherein $R^3$ and $R^4$ are each independently hydrogen, a substituted or unsubstituted C1 to C10 alkyl group, or are linked to each other to form a ring; and
the dichroic dye is the third dichroic dye when n and m are 1, respectively,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C20 aryl group, $-NR^3R^4$, or a combination thereof, wherein $R^3$ and $R^4$ are each independently hydrogen, a substituted or unsubstituted C1 to C10 alkyl group, or are linked to each other to form a ring.

23. The display device of claim 17, wherein
the plurality of dichroic dyes comprises n kinds of dichroic dyes, and the reflective color of the anti-reflective film satisfies the following relationship:

$$a^*_r = r_1 a^*_1 + r_2 a^*_2 + \ldots + r_n a^*_n; \text{ and}$$

$$b^*_r = r_1 b^*_1 + r_2 b^*_2 + \ldots + r_n b^*_n,$$

wherein
$a^*_1$ and $b^*_1$ denote a* and b* components of a reflective color of a polarizing film including a first kind of the n kinds of dichroic dyes at a reference weight in the CIE-Lab color coordinates, respectively,
$a^*_2$ and $b^*_2$ denote a* and b* components of a reflective color of a polarizing film including a second kind of the n kinds of dichroic dyes at the reference weight in the CIE-Lab color coordinates, respectively,
$a^*_n$ and $b^*_n$ denote a* and b* components of a reflective color of a polarizing film including an n-th kind of the n kinds of dichroic dyes at the reference weight in the CIE-Lab color coordinates, respectively,
$r_1$ denotes a ratio of a weight of the first kind of the n kinds of dichroic dyes with respect to the reference weight, $r_2$ denotes a ratio of a weight of the second kind of the n kinds of dichroic dyes with respect to the reference weight, and $r_n$ denotes a ratio of a weight of the n-th kind of the n kinds of dichroic dyes with respect to the reference weight.

24. The display device of claim 17, wherein the dichroic dye comprises n kinds of dichroic dyes, and a reflective color of the display device satisfies the following Relationship:

$$a^*_r = r_1 a^*_1 + r_2 a^*_2 + \ldots + r_n a^*_n; \text{ and}$$

$$b^*_r = r_1 b^*_1 + r_2 b^*_2 + \ldots + r_n b^*_n,$$

wherein $a^*_d$ and $b^*_d$ denote a* and b* components of the reflective color of the display device in the CIE-Lab color coordinates, respectively, $a^*_1$ and $b^*_1$ denote a* and b* components of a reflective color of a first reference polarizing film including a first kind of the n-kinds of dichroic dyes at a reference weight in the CIE-Lab color coordinates, respectively, $a^*_2$ and $b^*_2$ denote a* and b* components of a reflective color of a second reference polarizing film including a second kind of the n-kinds of dichroic dyes in the reference weight in the CIE-Lab color coordinates, respectively, $a^*_n$ and $b^*_n$ denote a* and b* components of a reflective color of an n-th reference polarizing film including an n-th kind of the n-kinds of dichroic dyes in the reference weight in the CIE-Lab color coordinates, respectively, $r_1$ denotes a ratio of a weight of the first kind of the n kinds of dichroic dyes in the plurality of dichroic dyes with respect to the reference weight, $r_2$ denotes a ratio of a weight of the second kind of the n kinds of dichroic dyes in the plurality of dichroic dyes with respect to the reference weight, $r_n$ denotes a ratio of a weight of the n-th kind of the n kinds of dichroic dyes in the plurality of dichroic dyes with respect to the reference weight, and A and B denote a* and b* components of a reflective color of the display panel in the CIE-Lab color coordinates, respectively.

25. The display device of claim 17, wherein the polymer comprises polyethylene, polypropylene, polyethylene terephthalate, polyethylene terephthalate glycol, polyethylenenaphthalate, nylon, a copolymer thereof, or a combination thereof.

26. The display device of claim 17, wherein the polarizing film has a dichroic ratio in a range of from about 2 to about 14 at a wavelength range of from about 450 nanometers to about 550 nanometers, wherein the dichroic ratio satisfies the following Equation:

$$DR = \text{Log}(1/T_\perp)/\text{Log}(1/T_\parallel),$$

wherein

DR denotes the dichroic ratio of the polarizing film, $T_\parallel$ denotes light transmittance of the polarization film regarding light polarized parallel to a transmissive axis of the polarization film, and $T_\perp$ denotes light transmittance of the polarization film regarding light polarized perpendicular to the transmissive axis of the polarization film.

27. The display device of claim 17, wherein the polarizing film has a dichroic ratio in a range from about 2 to about 14 in a wavelength ranging from about 380 nanometers to about 650 nanometers, wherein the dichroic ratio satisfies the following Equation:

$$DR = \text{Log}(1/T_\perp)/\text{Log}(1/T_\parallel),$$

wherein

DR denotes a dichroic ratio of the polarizing film, $T_\parallel$ denotes light transmittance of a polarization film regarding light polarized parallel to a transmissive axis of the polarization film, and $T_\perp$ denotes light transmittance of a polarization film regarding light polarized perpendicular to the transmissive axis of the polarization film.

28. The display device of claim 17, wherein the polarizing film has light transmittance greater than or equal to about 30%.

29. The display device of claim 17, wherein the polarizing film is a melt-blend of the polymer and the dichroic dye.

30. The display device of claim 17, wherein the display device has reflectance less than or equal to about 10%.

31. The display device of claim 17, wherein the compensation film comprises a $\lambda/4$ plate.

32. The display device of claim 17, wherein a thickness of the polarizing film is less than or equal to about 100 micrometers.

33. The display device of claim 17, wherein the display device comprises at least one of an organic light emitting diode display and a liquid crystal display.

34. A polarizing film comprising:

a polymer; and a plurality of dichroic dyes having an absorption wavelength region of about 380 nanometers to about 780 nanometers, wherein a reflective color of the polarizing film is substantially in a range of $-5 \leq a^*_p \leq 5$ and $-5 \leq b^*_p \leq 5$ in CIE-Lab color coordinates, and $a^*_p$ and $b^*_p$ denote a* and b* components of the reflective color of the polarizing film in the CIE-Lab color coordinates, resectively, wherein a reflectance of the polarizing film is less than or equal to about 10%, and wherein the polymer comprises a polyolefin, a polyamide, a polyester, a polyacryl, a polystyrene, a copolymer thereof, or a combination thereof.

35. The polarizing film of claim 34, wherein the plurality of dichroic dyes comprises at least two selected from:

at least one of a first dichroic dye having a maximum absorption wavelength in a wavelength range of about 380 nanometers to about 490 nanometers;

at least one of a second dichroic dye in a wavelength range of more than about 490 nanometers and less than or equal to about 580 nanometers; and at least one of a third dichroic dye in a wavelength range of more than about 580 nanometers and less than or equal to about 780 nanometers.

36. The polarizing film of claim 34, wherein the plurality of dichroic dyes comprise a compound represented by the Chemical Formula 1:

[Chemical Formula 1]

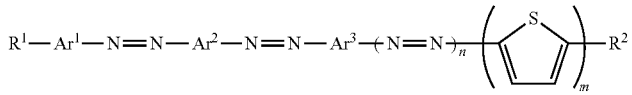

wherein, in Chemical Formula 1,
$Ar^1$ to $Ar^3$ are each independently a substituted or unsubstituted C6 to C15 arylene group,
$R^1$ is a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, or a combination thereof,
$R^2$ is hydrogen, a substituted or unsubstituted C1 to C30 aliphatic group, a substituted or unsubstituted C3 to C8 cycloaliphatic group, a substituted or unsubstituted C6 to C30 aromatic group, a substituted or unsubstituted C1 to C30 hetero aliphatic group, a substituted or unsubstituted C3 to C30 hetero aromatic group, a substituted or unsubstituted amino group, or a combination thereof, and
n and m are independently 0 or 1.

37. The polarizing film of claim 36, wherein
the compound represented by the Chemical Formula 1 is at least one selected from a first dichroic dye having a maximum absorption wavelength in wavelength range of about 380 nm to about 490 nm, a second dichroic dye having a maximum absorption wavelength in wavelength range of more than about 490 nm and less than or equal to about 580 nm, and a third dichroic dye having a maximum absorption wavelength in wavelength range of more than about 580 nm and less than about 780 nm, depending on n, m, $R^1$ and $R^2$ of the Chemical Formula 1,
the plurality of the dichroic dyes comprise the first dichroic dye and the second dichroic dye; the first dichroic dye and the third dichroic dye; the second dichroic dye and the third dichroic dye; at least two first dichroic dyes; at least two second dichroic dyes; at least two third dichroic dyes; or the first dichroic dye, the second dichroic dye and the third dichroic dye.

38. The polarizing film of claim 37, wherein
the dichroic dye is the first dichroic dye when n is 0 or 1 and m is 0,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, —$NR^3R^4$, or a combination thereof, wherein $R^3$ and $R^4$ are each independently hydrogen, a substituted or unsubstituted C1 to C10 alkyl group, or are linked to each other to form a ring;
the dichroic dye is the second dichroic dye when n is 0 or 1 and m is 1,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring; and
the dichroic dye is the third dichroic dye when n and m are 1, respectively,
$R^1$ is a substituted or unsubstituted C1 to C30 alkyl group, a substituted or unsubstituted C1 to C20 alkoxy group, a substituted or unsubstituted C1 to C20 thioalkyl group, a substituted or unsubstituted C3 to C30 ketone group, a substituted or unsubstituted C1 to C30 oxycarbonyl group, a substituted or unsubstituted C2 to C20 alkenyl group, a substituted or unsubstituted C2 to C30 alkynyl group, or a combination thereof, and
$R^2$ is hydrogen, a substituted or unsubstituted C1 to C30 alkyl group, a substituted or unsubstituted C6 to C20 aryl group, —$NR^3R^4$, or a combination thereof, wherein $R^3$ and $R^4$ are each independently hydrogen, a substituted or unsubstituted C1 to C10 alkyl group, or are linked to each other to form a ring.

39. The polarizing film of claim 34, wherein the plurality of dichroic dye comprises n kinds of dichroic dyes, and
the reflective color of the polarizing film satisfies the following Relationship:

$$a^*_p = r_1 a^*_1 + r_2 a^*_2 + \ldots + r_n a^*_n; \text{ and}$$

$$b^*_p = r_1 b^*_1 + r_2 b^*_2 + \ldots + r_n b^*_n,$$

wherein
$a^*_1$ and $b^*_1$ denote $a^*$ and $b^*$ components of a reflective color of a first reference polarizing film including a first kind of the n kinds of dichroic dyes at a reference weight in the CIE-Lab color coordinates, respectively,
$a^*_2$ and $b^*_2$ denote $a^*$ and $b^*$ components of a reflective color of a second reference polarizing film including a second kind of the n kinds of dichroic dyes at the reference weight in the CIE-Lab color coordinates, respectively,
$a^*_n$ and $b^*_n$ denote $a^*$ and $b^*$ components of a reflective color of a n-th reference polarizing film including an n-th kind of the n kinds of dichroic dyes at the reference weight in the CIE-Lab color coordinates, respectively,
$r_1$ denotes a ratio of a weight of the first kind of the n kinds of dichroic dyes in the plurality of dichroic dyes with respect to the reference weight,
$r_2$ denotes a ratio of a weight of the second kind of the n kinds of dichroic dyes in the plurality of dichroic dyes with respect to the reference weight, and
$r_n$ denotes a ratio of a weight of the n-th kind of the n kinds of dichroic dyes in the plurality of dichroic dyes with respect to the reference weight.

40. The polarizing film of claim 34, wherein the plurality of dichroic dyes is in an amount of about 0.01 part to about 10 parts by weight based on 100 parts by weight of the polymer.

41. The polarizing film of claim 34, wherein the polymer comprises polyethylene, polypropylene, polyethylene terephthalate, polyethylene terephthalate glycol, polyethylenenaphthalate, nylon, a copolymer thereof, or a combination thereof.

42. The polarizing film of claim 34, wherein the polarizing film has light transmittance greater than or equal to about 30%.

43. The polarizing film of claim 34, wherein the plurality of dichroic dyes is substantially homogeneously dispersed in the polymer.

44. The polarizing film of claim 34, wherein a thickness of the polarizing film is less than or equal to about 100 micrometers.

\* \* \* \* \*